(12) United States Patent
Brunstetter

(10) Patent No.: US 10,557,641 B2
(45) Date of Patent: Feb. 11, 2020

(54) ADAPTIVE PID CONTROL FOR CHILLED WATER CRAC UNITS

(71) Applicant: Liebert Corporation, Columbus, OH (US)

(72) Inventor: Craig A. Brunstetter, Sunbury, OH (US)

(73) Assignee: Vertiv Corporation, Columbus, OH (US)

(*) Notice: Subject to any disclaimer, the term of this patent is extended or adjusted under 35 U.S.C. 154(b) by 0 days.

(21) Appl. No.: 15/727,257

(22) Filed: Oct. 6, 2017

(65) Prior Publication Data

US 2018/0100665 A1    Apr. 12, 2018

Related U.S. Application Data

(60) Provisional application No. 62/405,494, filed on Oct. 7, 2016.

(51) Int. Cl.
*F24F 11/30* (2018.01)
*G05B 13/02* (2006.01)
(Continued)

(52) U.S. Cl.
CPC .......... *F24F 11/30* (2018.01); *G05B 13/0205* (2013.01); *F24F 11/64* (2018.01); *F24F 11/84* (2018.01); *F24F 2110/10* (2018.01)

(58) Field of Classification Search
None
See application file for complete search history.

(56) References Cited

U.S. PATENT DOCUMENTS 5,355,305 A   10/1994  Seem et al.
5,506,768 A    4/1996  Seem et al.
(Continued)

FOREIGN PATENT DOCUMENTS

EP    2490088 A2    8/2012
WO    WO-9905578 A1 *  2/1999  ............. G05B 11/42

OTHER PUBLICATIONS

David King, The Benefits of Supply Air Temperature Control in the Datacenter [online], Aug. 2010 [retrieved on Oct. 30, 2018]. Retrieved from <https://www.futurefacilities.com/resources/whitepapers/the-benefits-of-supply-air-temperature-control-in-the-datacenter/download/> (Year: 2010).*

(Continued)

*Primary Examiner* — Thomas C Lee
*Assistant Examiner* — Charles Cai
(74) *Attorney, Agent, or Firm* — Harness, Dickey & Pierce, P.L.C.

(57) ABSTRACT

The present disclosure relates to a proportional, integral, derivative (PID) control system for controlling a cooling component of a cooling unit. The system may make use of a PID actuator position controller, a memory in communication with the PID actuator position controller, and a plurality of look-up tables. The look-up tables may be stored in the memory and may set forth different proportional "P", integral ("I") and derivative ("D") gains based on an operating variable associated with operation of the cooling component of the cooling unit. The PID actuator position controller uses the lookup tables together with determination of projected data and historical data, to adjust at least one of the P, I and D gains in real time.

15 Claims, 34 Drawing Sheets

(51) Int. Cl.
*F24F 11/84* (2018.01)
*F24F 11/64* (2018.01)
*F24F 110/10* (2018.01)

(56) References Cited

U.S. PATENT DOCUMENTS

| | | | |
|---|---|---|---|
| 5,544,039 A * | 8/1996 | Hiroi | G05B 13/048 |
| | | | 700/31 |
| 5,568,377 A | 10/1996 | Seem et al. | |
| 6,937,909 B2 | 8/2005 | Seem | |
| 7,331,191 B2 | 2/2008 | He et al. | |
| 7,890,215 B2 | 2/2011 | Duncan | |
| 8,406,929 B2 | 3/2013 | Duncan | |
| 8,688,243 B2 | 4/2014 | Federspiel et al. | |
| 8,793,003 B2 | 7/2014 | Laughman et al. | |
| 8,996,141 B1 * | 3/2015 | Alsaleem | F25B 49/02 |
| | | | 700/37 |
| 9,091,496 B2 | 7/2015 | Imwalle et al. | |
| 9,158,345 B1 | 10/2015 | Rice et al. | |
| 9,261,288 B2 | 2/2016 | Okamoto et al. | |
| 9,278,303 B1 | 3/2016 | Somani et al. | |
| 9,291,358 B2 | 3/2016 | Federspiel et al. | |
| 2004/0256473 A1 * | 12/2004 | Hull | F24F 13/08 |
| | | | 236/49.3 |
| 2009/0032235 A1 * | 2/2009 | Sullivan | G05B 19/048 |
| | | | 165/247 |
| 2009/0319060 A1 * | 12/2009 | Wojsznis | G05B 11/42 |
| | | | 700/30 |
| 2010/0041327 A1 * | 2/2010 | Desler | F24F 1/0007 |
| | | | 454/184 |
| 2011/0184707 A1 | 7/2011 | Miura | |
| 2013/0098597 A1 * | 4/2013 | Fujimoto | H05K 7/20745 |
| | | | 165/287 |
| 2014/0031956 A1 | 1/2014 | Slessman et al. | |
| 2014/0242899 A1 * | 8/2014 | Liu | F24F 1/0007 |
| | | | 454/258 |
| 2015/0057812 A1 * | 2/2015 | Zhao | G05B 13/0205 |
| | | | 700/276 |
| 2015/0206776 A1 * | 7/2015 | Mimura | H01L 21/67248 |
| | | | 62/3.7 |
| 2015/0233597 A1 | 8/2015 | Dempster et al. | |
| 2016/0047578 A1 | 2/2016 | Warren | |

OTHER PUBLICATIONS

Pyrhonen V-P et al. "Gain-scheduled composite nonlinear feedback control of an exothermic chemical reactor", 2016 European Control Conference (ECC), IEEE, Jun. 29, 2016, pp. 67-73, XP033037432, DOI: 10.1109/ECC.2016.7810265 [retrieved on Jan. 6, 2017].

Salah, Ali Ameur Haj et al. "Controller interpolation methods for transistion and control of nonlinear systems", 2016 International Conference on Control, Decision and Information Technologies (CODIT), IEEE, Apr. 6, 2016, pp. 769-773, XP032981249, DOI: 10.1109/CODIT.2016.7593660 [retrieved on Oct. 18, 2016].

International Search Report and Written Opinion from corresponding International Application No. PCT/US2017/055590, dated Feb. 8, 2018, 24 pp.

* cited by examiner

TABLE A 4.2.4.1.7 Increase I (decrease response) Determination Window 1
Refer to increase P Window 1 description (See Figure 4)

4.2.4.1.8 Increase I (decrease response) Determination Window 2
Refer to increase P Window 2 description (See Figure 5)

4.2.4.1.9 Increase I (decrease response) Determination Window 3
Refer to increase P Window 3 description (See Figure 6)

4.2.4.1.10 Decrease I (increase response) Determination Window 1
Refer to decrease P Window 1 description (See Figure 7)

4.2.4.1.11 Decrease I (increase response) Determination Window 2
Refer to decrease P Window 2 description (See Figure 8)

4.2.4.1.12 Decrease I (increase response) Determination Window 3
Refer to decrease P Window 3 description (See Figure 9)

4.2.4.1.13 Increase D (increase response) Determination Window 1
Refer to increase P Window 1 description (See Figure 4)

4.2.4.1.14 Increase D (increase response) Determination Window 2
Refer to increase P Window 2 description (See Figure 5)

4.2.4.1.15 Increase D (increase response) Determination Window 3
Refer to increase P Window 3 description (See Figure 6)

4.2.4.1.16 Decrease D (decrease response) Determination Window 1
Refer to decrease P Window 1 description (See Figure 7)

4.2.4.1.17 Decrease D (decrease response) Determination Window 2
Refer to decrease P Window 2 description (See Figure 8)

4.2.4.1.18 Decrease D (decrease response) Determination Window 3
Refer to decrease P Window 3 description (See Figure 9)

FIGURE 9a

TABLE B 4.2.4.2.7  Increase I (decrease response) Determination Window 1
Refer to increase P Window 1 description (See Figure 11)

4.2.4.2.8  Increase I (decrease response) Determination Window 2
Refer to increase P Window 2 description (See Figure 12)

4.2.4.2.9  Increase I (decrease response) Determination Window 3
Refer to increase P Window 3 description (See Figure 13)

4.2.4.2.10  Decrease I (increase response) Determination Window 1
Refer to decrease P Window 1 description (See Figure 14)

4.2.4.2.11  Decrease I (increase response) Determination Window 2
Refer to decrease P Window 2 description (See Figure 15)

4.2.4.2.12  Decrease I (increase response) Determination Window 3
Refer to decrease P Window 3 description (See Figure 16)

4.2.4.2.13  Increase D (increase response) Determination Window 1
Refer to increase P Window 1 description (See Figure 11)

4.2.4.2.14  Increase D (increase response) Determination Window 2
Refer to increase P Window 2 description (See Figure 12)

4.2.4.2.15  Increase D (increase response) Determination Window 3
Refer to increase P Window 3 description (See Figure 13)

4.2.4.2.16  Decrease D (decrease response) Determination Window 1
Refer to decrease P Window 1 description (See Figure 14)

4.2.4.2.17  Decrease D (decrease response) Determination Window 2
Refer to decrease P Window 2 description (See Figure 15)

4.2.4.2.18  Decrease D (decrease response) Determination Window 3
Refer to decrease P Window 3 description (See Figure 16)

FIGURE 16a

TABLE C 4.2.4.3.7   Increase I (decrease response) Determination Window 1 Refer to increase P Window 1 description (See Figure 18)

4.2.4.3.8   Increase I (decrease response) Determination Window 2 Refer to increase P Window 2 description (See Figure 19)

4.2.4.3.9   Increase I (decrease response) Determination Window 3 Refer to increase P Window 3 description (See Figure 20)

4.2.4.3.10   Decrease I (increase response) Determination Window 1 Refer to decrease P Window 1 description (See Figure 21)

4.2.4.3.11   Decrease I (increase response) Determination Window 2 Refer to decrease P Window 2 description (See Figure 22)

4.2.4.3.12   Decrease I (increase response) Determination Window 3 Refer to decrease P Window 3 description (See Figure 23)

4.2.4.3.13   Increase D (increase response) Determination Window 1 Refer to increase P Window 1 description (See Figure 18)

4.2.4.3.14   Increase D (increase response) Determination Window 2 Refer to increase P Window 2 description (See Figure 19)

4.2.4.3.15   Increase D (increase response) Determination Window 3 Refer to increase P Window 3 description (See Figure 20)

4.2.4.3.16   Decrease D (decrease response) Determination Window 1 Refer to decrease P Window 1 description (See Figure 21)

4.2.4.3.17   Decrease D (decrease response) Determination Window 2 Refer to decrease P Window 2 description (See Figure 22)

4.2.4.3.18   Decrease D (decrease response) Determination Window 3 Refer to decrease P Window 3 description (See Figure 23)

FIGURE 23a

TABLE D 4.2.4.4.7 Increase I (decrease response) Determination Window 1 Refer to increase P Window 1 description (See Figure 25)

4.2.4.4.8 Increase I (decrease response) Determination Window 2 Refer to increase P Window 2 description (See Figure 26)

4.2.4.4.9 Increase I (decrease response) Determination Window 3 Refer to increase P Window 3 description (See Figure 27)

4.2.4.4.10 Decrease I (increase response) Determination Window 1 Refer to decrease P Window 1 description (See Figure 28)

4.2.4.4.11 Decrease I (increase response) Determination Window 2 Refer to decrease P Window 2 description (See Figure 29)

4.2.4.4.12 Decrease I (increase response) Determination Window 3 Refer to decrease P Window 3 description (See Figure 30)

4.2.4.4.13 Increase D (increase response) Determination Window 1 Refer to increase P Window 1 description (See Figure 25)

4.2.4.4.14 Increase D (increase response) Determination Window 2 Refer to increase P Window 2 description (See Figure 26)

4.2.4.4.15 Increase D (increase response) Determination Window 3 Refer to increase P Window 3 description (See Figure 27)

4.2.4.4.16 Decrease D (decrease response) Determination Window 1 Refer to decrease P Window 1 description (See Figure 28)

4.2.4.4.17 Decrease D (decrease response) Determination Window 2 Refer to decrease P Window 2 description (See Figure 29)

4.2.4.4.18 Decrease D (decrease response) Determination Window 3 Refer to decrease P Window 3 description (See Figure 30)

FIGURE 30a

ADAPTIVE PID CONTROL FOR CHILLED WATER CRAC UNITS

CROSS-REFERENCE TO RELATED APPLICATIONS

This application claims the benefit of U.S. Provisional Application No. 62/405,494, filed on Oct. 7, 2016. The entire disclosure of the above application is incorporated herein by reference.

FIELD

The present disclosure relates to control systems for refrigeration systems, and more particularly to a control system for a refrigeration system which automatically adjusts one or more gains of a PID controller of the system to control the gains applied to a chilled water valve PID controller and a unit fan PID controller, to thus eliminate the need for manual tuning of these gain(s) by an individual.

BACKGROUND

This section provides background information related to the present disclosure which is not necessarily prior art.

Various operating, ambient, and site conditions require manual tuning of a chilled water valve and unit fan PID controller. Furthermore, the PID controller may be initially tuned but the ambient, operating and site conditions in the area in which the refrigeration system is being used may change. Still further, unit interactions between multiple systems may cause or contribute to significant fan/valve oscillations. This will require manual PID tuning by a qualified operator. Additionally, multiple units in a data center may require iterative tuning because of unit interactions. Accordingly, there is a need to eliminate the requirement to manually tune chilled water CRACs in the datacenter due to operating, ambient, and site condition changes, as well as changes caused by unit interactions. Valve and fan oscillations can lead to poor supply air temperature and remote air temperature control in data centers. Furthermore, excessive oscillations can lead to premature equipment failure.

SUMMARY

This section provides a general summary of the disclosure, and is not a comprehensive disclosure of its full scope or all of its features.

In one aspect the present disclosure relates to A proportional, integral, derivative (PID) control system for controlling a cooling component of a cooling unit. The system may include a PID actuator position controller, a memory in communication with the PID actuator position controller, and a plurality of look-up tables. The look-up tables may be stored in the memory and may set forth different proportional "P", integral ("I") and derivative ("D") gains based on an operating variable associated with operation of the cooling component of the cooling unit. The PID actuator position controller uses the lookup tables together with determination of projected data and historical data, to adjust at least one of the P, I and D gains in real time.

In another aspect the present disclosure relates to a proportional, integral, derivative (PID) control system for controlling a cooling component of a cooling unit. The system may include a PID actuator position controller, a memory in communication with the PID actuator position controller, and a plurality of look-up tables stored in the memory. The look-up tables may set forth different proportional "P", integral ("I") and derivative ("D") gains based on an operating variable associated with operation of the cooling component of the cooling unit. A plurality of algorithms are stored in the memory and used by the PID actuator position controller to help determine the gains to be used in controlling the cooling component. The PID actuator position controller uses the look-up tables together with a limited slope calculation, wherein the limited slope calculation defines projected behavior of the operating variable based on historical data, to determine different P, I and D gains to be used in controlling the PID actuator position controller within a plurality of different operating regions of the cooling variable.

In still another aspect the present disclosure relates to a method for controlling a cooling component of a cooling unit. The method may include using a PID actuator position controller to control a proportional gain (P), an integral gain (I) and a derivative gain (D). The method may further include using a memory to communicate with the PID actuator position controller, and storing a plurality of look-up tables in the memory. The look-up tables may be used to hold different proportional, integral and derivative gains based on an operating variable associated with operation of the cooling component of the cooling unit. The method may further involve causing the PID actuator position controller to access the lookup tables and to determine projected operating data and historical operating data for the cooling component, and to adjust at least one of the P, I and D gains for the cooling component in real time in response to evaluations of the projected and historical operating data.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 9a is a table showing which ones of the previous graphs should be referred to for an understanding of how the I and D gains are adjusted for the low fan speed adapts region of operation;

FIG. 16a is a table showing which ones of the previous graphs should be referred to for an understanding of how the I and D gains are adjusted for the medium 1 fan speed adapts region of operation;

FIG. 23a is a table showing which ones of the previous graphs should be referred to for an understanding of how the I and D gains are adjusted for the medium 2 fan speed adapts region of operation;

Figure 28:
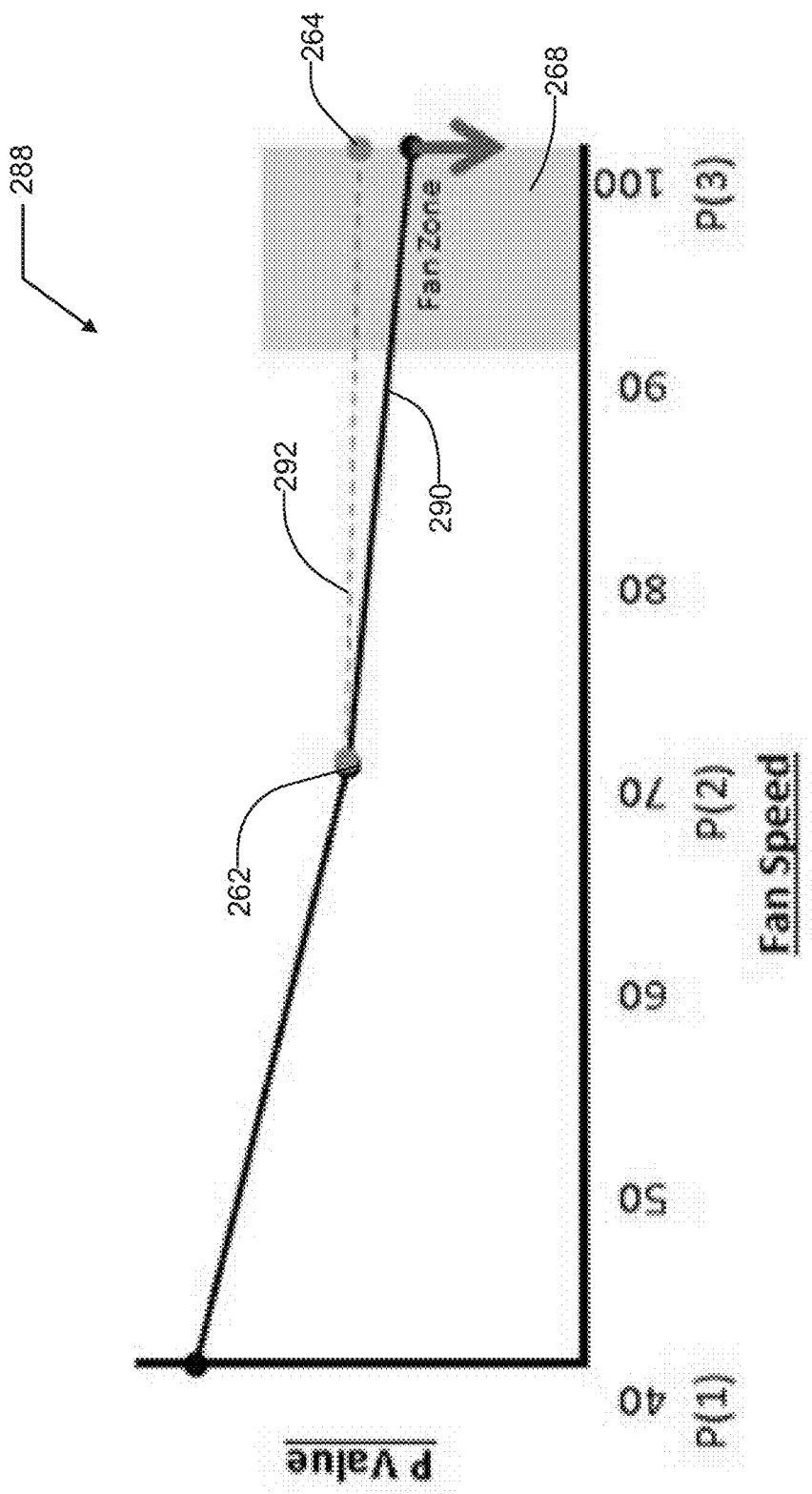
Figure 29:
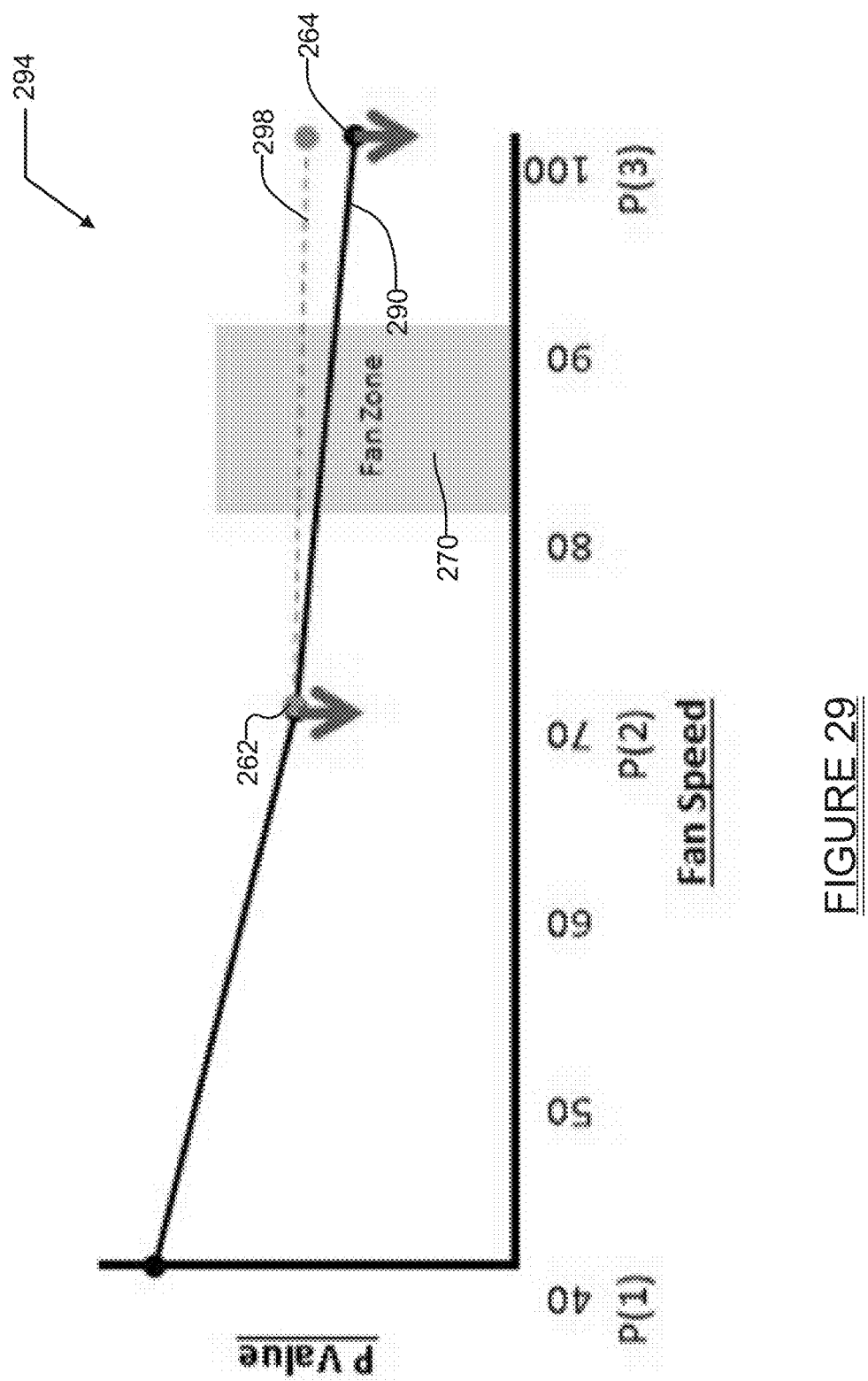
Figure 30:
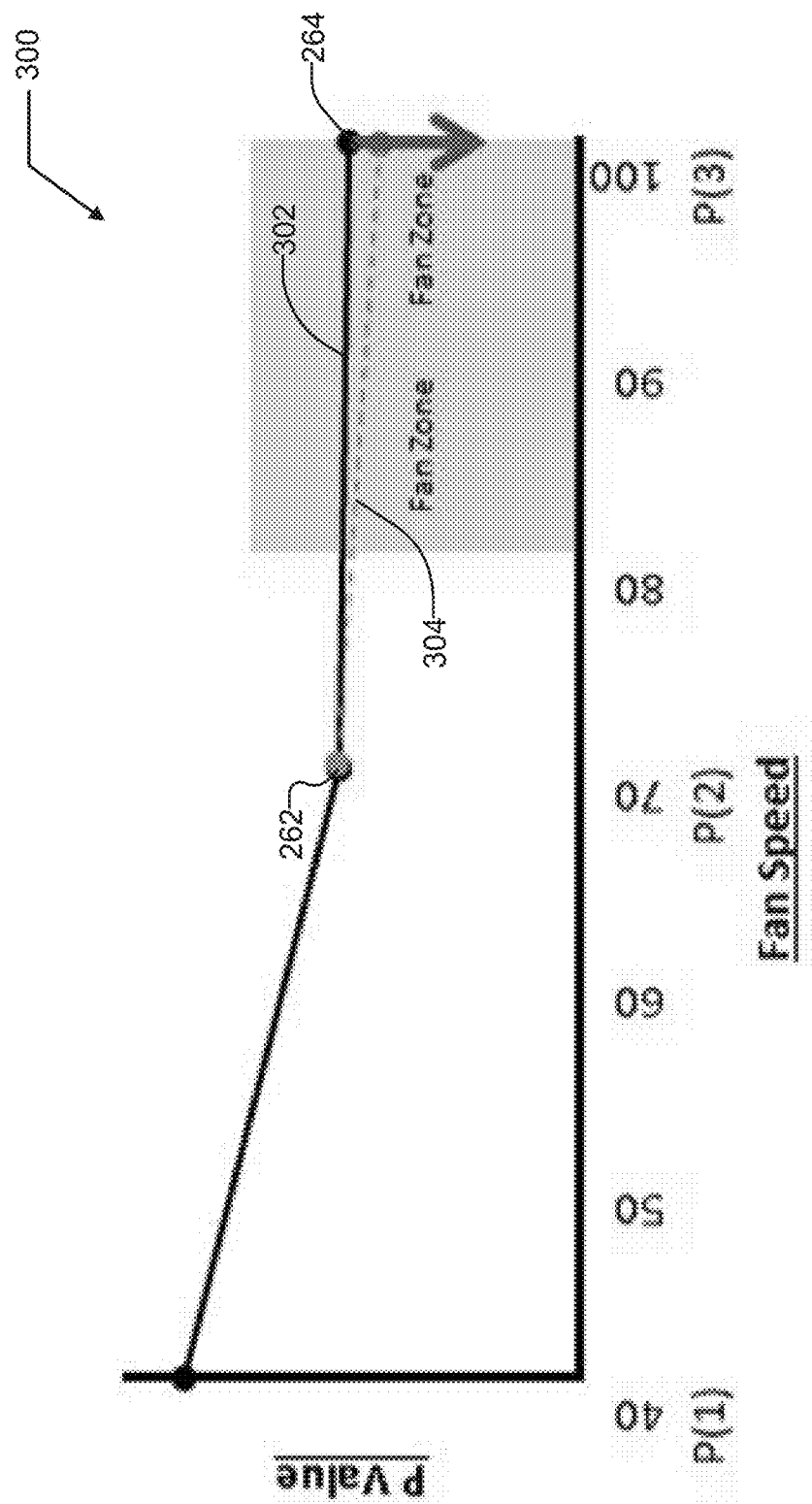

FIGS. 25-30 show graphs to illustrate the high fan speed valve adapts, and more particularly how the proportional gain is controlled by adjusting one or more points relating to fan speed based on a comparison of connecting line slopes and limited slope calculations; and FIG. 30a is a table showing which ones of the previous graphs should be referred to for an understanding of how the I and D gains are adjusted for the high fan speed valve adapts region of operation.

DETAILED DESCRIPTION

Example embodiments will now be described more fully with reference to the accompanying drawings.

Figure 1:
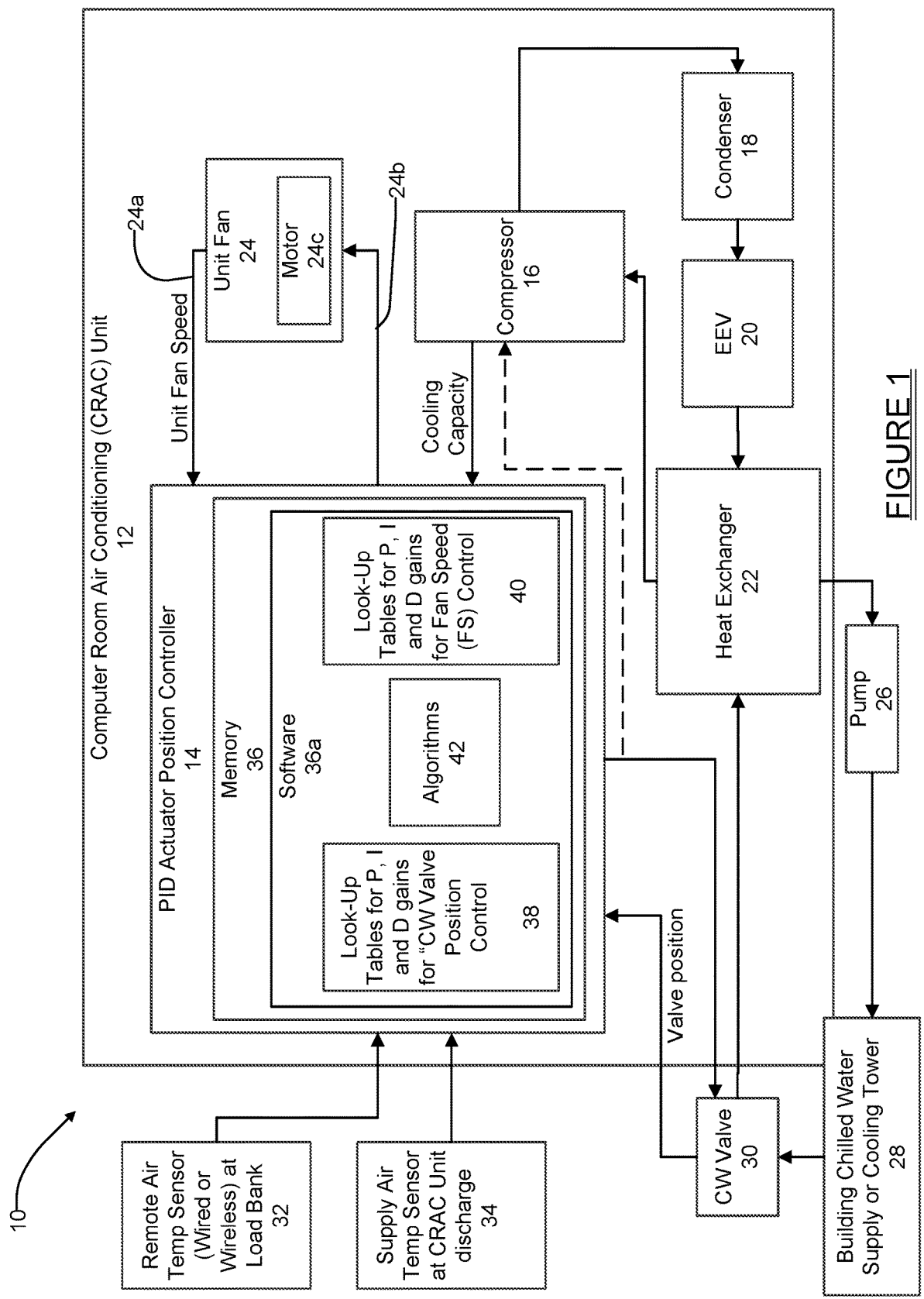
FIG. 1 is a high level block diagram of one embodiment of a system in accordance with the present invention.

Referring to FIG. 1 there is shown a system 10 in accordance with one embodiment of the present disclosure. The system 10 may include a computer controlled room air conditioning (CRAC) unit 12 having a PID actuator position controller 14 (hereinafter simply "PID controller 14"), a compressor 16, a condenser 18, an EEV 20, a heat exchanger 22, and a unit fan 24. Alternatively, the heat exchanger 22 may be in communication with an inlet of a pump 26 which pumps water back to a chilled water supply or cooling tower 28. The chilled water supply or cooling tower 28 communicates with a CW ("chilled water") valve 30.

The PID controller 14 also receives inputs from a remote air temperature sensor 32 located at a load bank. The load bank may be, for example, a row of equipment racks containing servers, power distribution units or other data center devices. The PID controller 14 also receives an input from a supply air temperature sensor 34 located at a discharge port of the CRAC unit 12. The PID controller 14 also is in bidirectional communication with the unit fan 24 and receives as an input a signal on line 24a representative of the unit fan speed, and outputs a control signal on line 24b which controls a motor 24c of the unit fan 24, to thus control the unit fan speed.

The PID controller 14 includes a memory 36 having software 36a which contains look-up tables 38 for helping to determine the "P" (proportional), "I" (integral) and "D" (derivative) gains used for controlling the position of the CW valve 30, as well as look-up tables 40 for helping to determine the P, I and D gains for use in controlling the unit fan 24 speed. Algorithms 42 are also included for use by the PID controller 14, in connection with the look-up tables 38 and 40, to help determine the gains to be used in controlling the position of the CW valve 30 and the speed of the unit fan 24. The following discussion will be directed to controlling the position of the CW valve 30.

The algorithms 42 output the proportional band, integration time, and derivative time to be used by the PID controller 14. The control variable is supply air temperature. The algorithms 42 are applicable to chilled water units with a single valve or parallel double valves, and which have a supply temperature sensor preferably at least six feet downstream of the heat exchanger 22 coil. The execution rate may vary, but in one example is five seconds. By "execution rate" it is meant the rate the algorithms 42 are called by the software 36a running in the PID controller 14.

Legacy proportional band, integral time, and derivative time are single point inputs. The algorithms 42 of the present disclosure utilize a feed-forward control strategy where the proportional band, integral time, and derivative time are obtained from 3-point look-up tables. The 3-point look-up tables are collectively represented by look-up tables 40 in FIG. 1, and are based on unit fan speed. Furthermore, the individual points on each 3-point look-up table can adapt to become more or less aggressive based on logic based rules to account for various system disturbances.

Figure 2:
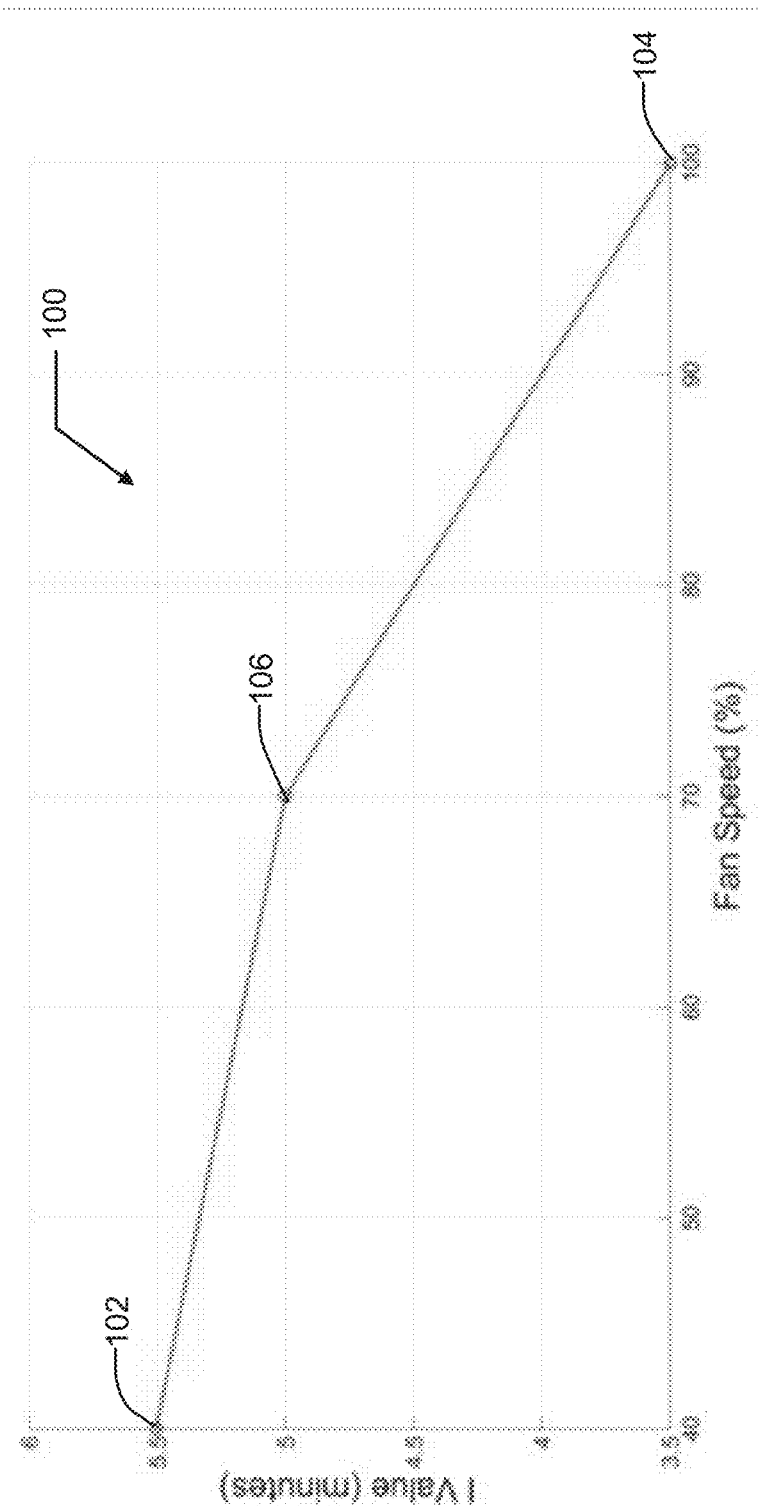
FIG. 2 is a graph illustrating the windows of the low fan speed adapts region, and how the windows within this region are constructed.

The look-up tables 38 include separate 3-point look-up tables for proportional (P), integral (I), and derivative (D) gains. All three look-up tables share a common fan speed axis. As illustrated in FIG. 2, the fan speed axis has a point at the minimum fan speed setting, identified by reference number 102, at the maximum fan speed setting, identified by reference number 104, and at the ((max−min)/2)+min fan speed point, which is identified by reference number 106. The adaptive logic of the algorithms 42 reacts to the system 10 response to increase or decrease the PID gains. Increasing the response corresponds with decreasing the P and I gain values, and increasing the D gain value. Increasing the response also corresponds with increasing the P, I and D gains. Decreasing the response corresponds with increasing the P gain and I gain values, and decreasing the D gain value. Decreasing the response also corresponds with decreasing the P, I and D gains.

Adapting will be inhibited for an amount of time after the system 10 startup. The amount of time may differ for increasing response and decreasing response adapts. Any pending adapts will reset if any one of the following is true: there has been an adaptive change; the fan speed change has been too large; the control temperature has been within a preset deadband for a sufficiently long period of time; or there has been minimal valve changes during a predetermined extended period of time. By "minimal valve changes" it is meant changes of less than a minimum predetermined amount, for example less than about 2.5% during the predetermined extended time. However, this predetermined minimum amount of change may vary to best meet the needs of a specific application.

A response decrease is determined by the frequency and period of valve oscillations of the OW valve 30. The P and I adapts have a min/max filtered valve position. The min/max position delta and time between the min/max filtered valve positions determine the amount of adapting to the PI gains. The D adapts may have a separate min/max calculation and timer. The min/max position delta and time between the min/max filtered valve positions determine the amount of adapting to the D gain. The algorithms 42 may also incorporate logic to determine whether the P, I, and/or D terms should be adapted based on the individual P, I, and D components (i.e., the proportional, integral and derivative components of the PID control position) of the PID controller 14 and historical values of the gains.

A response increase is determined by the response time of the physical system being controlled. System response time is manually calculated via a step change in the CW valve 30 position. The time constant to this step change, plus a buffer, is recorded and used for system response time. Future iterations of this control algorithm may include intrusive action to determine system response time. By "intrusive action" it is meant a controlled step change to observe the response. An example would be a change to the CW valve 30 position to observe response time to a corresponding sensor. A PI timer associated with the PID controller 14 is enabled if the following are true: temperature error is outside the predetermined deadband; the CRAC unit 12 is outside a startup window; the CRAC Unit 12 is in PID control; the CW Valve 30 position is less than max and greater than min; decrease D response is not active; and Unit fan 24 speed delta is less than a predetermined value.

An increase PI response will occur if the PI timer of the PID controller 14 exceeds a variable value based on Unit fan 24 speed, on temperature error, and the CW valve 30 position. The amount of adapting depends on the normalized temperature error, which in this example is selected to be 63% from the min or max temperature error. No adapting will occur if the normalized temperature error is below the selected 63% threshold. There may also be a multiplier, which may be termed a "low temperature error multiplier", to reduce the adapting if temperature error is less than a value specified in one of the look-up tables 38 or 40. The algorithms 42 may include logic to determine if P or I should be adapted based on past adaptive gains. Logic may also be included to determine if the I response should be increased before the P response based on a CW valve 30 position spike.

An increase D response is enabled by the PID controller 14 if any one of the following is true: PI timer is enabled; temperature error spikes above a value (excess heat in data center); Increase D bit is enabled; Max P position is greater than max D position; or temperature derivative is greater than a predetermined value. The amount of D adapting depends on the max temperature error.

Adapt Table Points

The look-up tables 38 of FIG. 1 contain separate 3-point look-up tables for proportional (P), integral (I), and derivative (D) gains for OW valve 30 control, which are all based on fan speed (i.e., fan speed being a component of an X axis on an X-Y graph). Likewise, the look-up tables 40 contain three separate 3-point look-up tables for unit fan speed control, which are all based on supply air temperature.

Referring to the look-up tables 38 and 40, which as noted above are for the CW valve 30 position control and for the unit fan speed control, each of the look-up tables in this group has three points: P(1), P(2), P(3); I(1), I(2), I(3); and D(1), D(2), D(3). With regard to look-up table 38, logic in the algorithms 42 determines which point(s) to increase/decrease based on fan speed, connecting line slope compared with a limited slope calculation, and whether an increase or decrease response is required. The limited slope calculation is expressed as follows:

$$((K\_TPID\_PConst\_Max-KTPID\_PConst\_Min)/3)/(K\_TPID\_FanAxis(2)-K\_TPID\_Fan\_Axis(1))$$

K_TPID_PConst_Max=maximum P value (e.g., 80)
K_TPID_PConst_Min=minimum P value (e.g., 10)
K_TPID_Fan_Axis=Fan speed axis (so in this case 70–40)

The above limited slope calculation defines the dashed lines that appear in the graphs of FIGS. 3-30. The limited slope calculation may be thought of as a calculation that defines the minimum delta between y-axis data points in the look-up tables 38 (i.e., the y-value, which may be a P value, an I value or a D value).

The increase or decrease response multiplier will be applied to the table point(s). The system 10 demarcates a plurality of distinct regions for controlling the P, I and D gains: a "low fan speed valve adapts" region; a "medium 1 fan speed valve adapts" region; a "medium 2 fan speed valve adapts" region; and a "high fan speed valve adapts" region. These regions will be discussed in greater detail in the following paragraphs.

Low Fan Speed Valve Adapts

Figure 3:
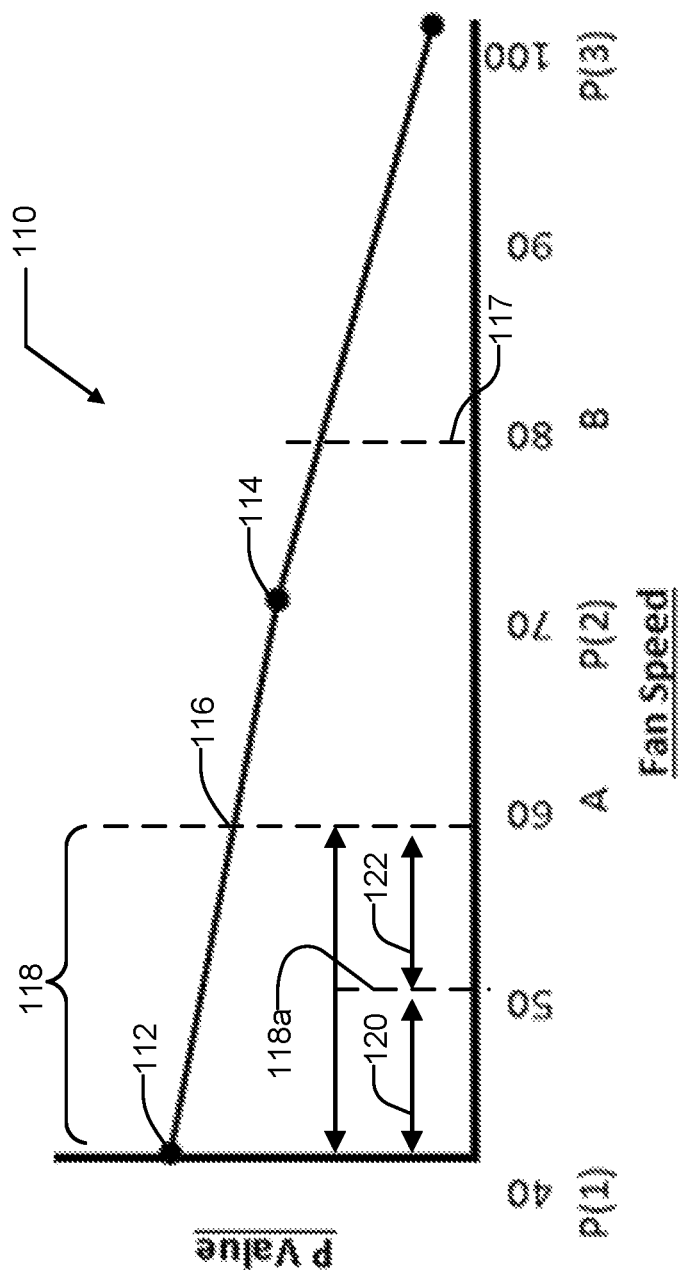
FIGS. 3-9 show graphs to illustrate low fan speed adapts, and more particularly how the proportional gain is controlled by adjusting one or more points relating to fan speed based on a comparison of connecting line slopes and limited slope calculations.

With reference to graph 110 of FIG. 3, point 116 (also identified by point "A" under the X axis) between the low unit fan 24 speed 112 and medium fan speed 114, is a modifiable point which defines the "medium 1 fan speed". The region between the low fan speed 112 and point 116 is termed the "low fan speed adapts" region 118. Window 1 (denoted by arrow 120) is the zone between the low fan speed 112 to a midpoint 118a of the low fan speed adapts region 118. Window 2 is denoted by reference number 122 and forms the zone between the midpoint 118a of the low fan speed adapts region 118 and the modifiable point 116. Window 3 includes Window 1 and Window 2 and thus also defines the area covered by the low fan speed adapts region 118. Point B (reference number 117) on FIG. 3 in this example defines the medium 2 fan speed.

Increase P (Reduce Response) Determination Window 1

Figure 4:
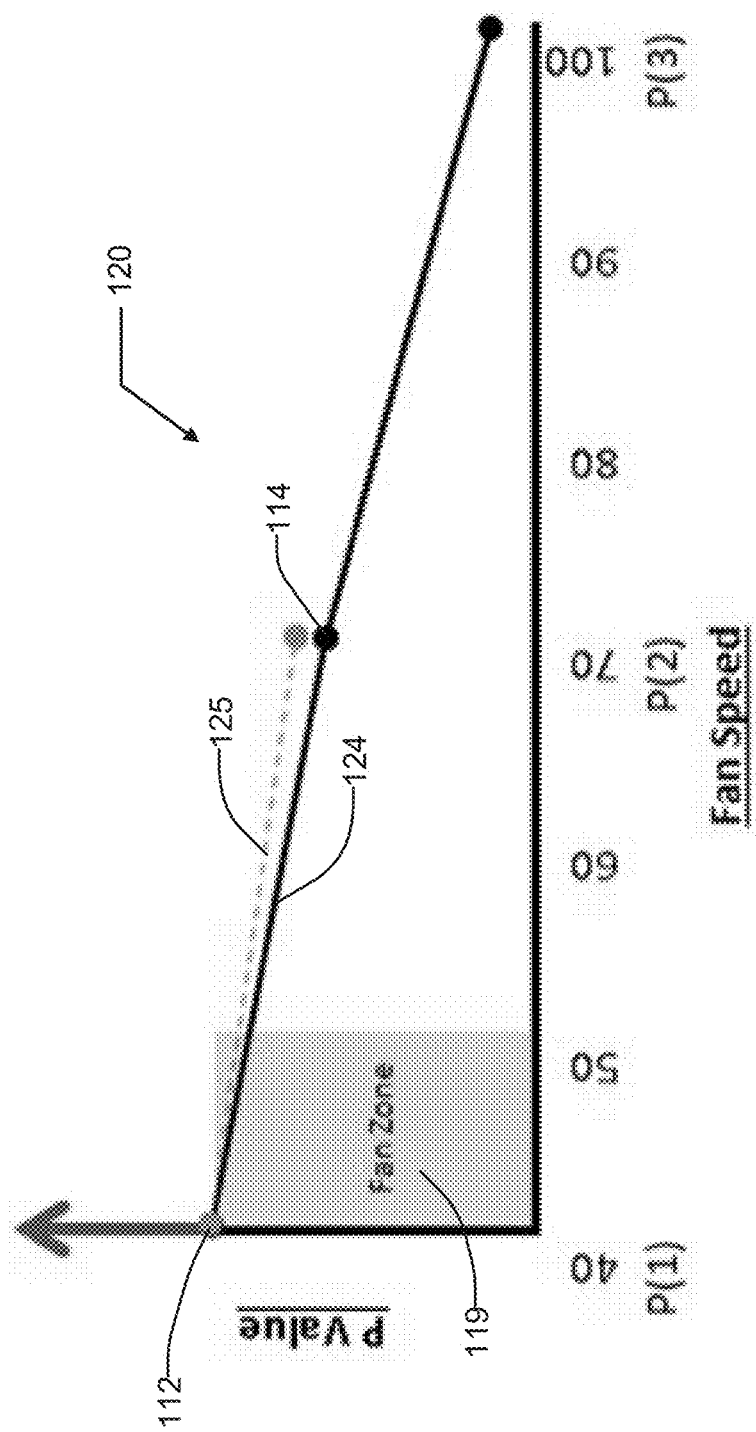

Referring to graph 120 of FIG. 4, the PD controller 14 will increase the value of P(1) if the table slope 124 between P(1) (point 112) and P(2) (point 114) is more negative than the limited slope calculation 125 and the unit fan 24 speed is in Window 1 (area 119).

Increase P (Reduce Response) Determination Window 2

Figure 5:
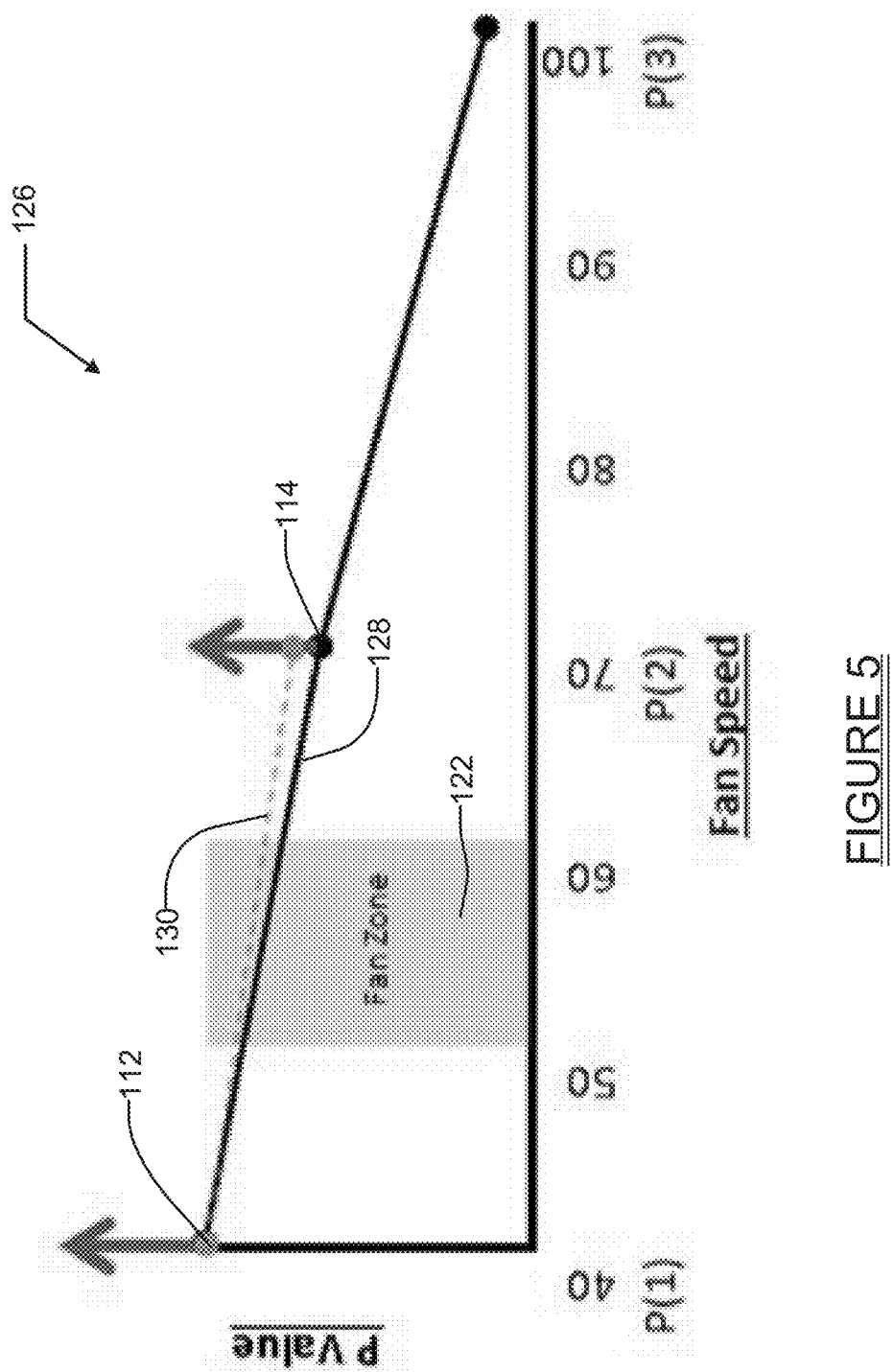

Referring to graph 126 of FIG. 5, the PID controller 14 makes a determination to increase the values of P(1) (point 112) and P(2) (point 114) if the table slope 128 between P(1) and P(2) is more negative than a limited slope calculation 130, and the unit fan 24 speed is in Window 2 (area 122). The values of P(1) and P(2) will be adjusted based on a normalization multiplier as a function of fan speed.

Increase P (Reduce Response) Determination Window 3

Figure 6:
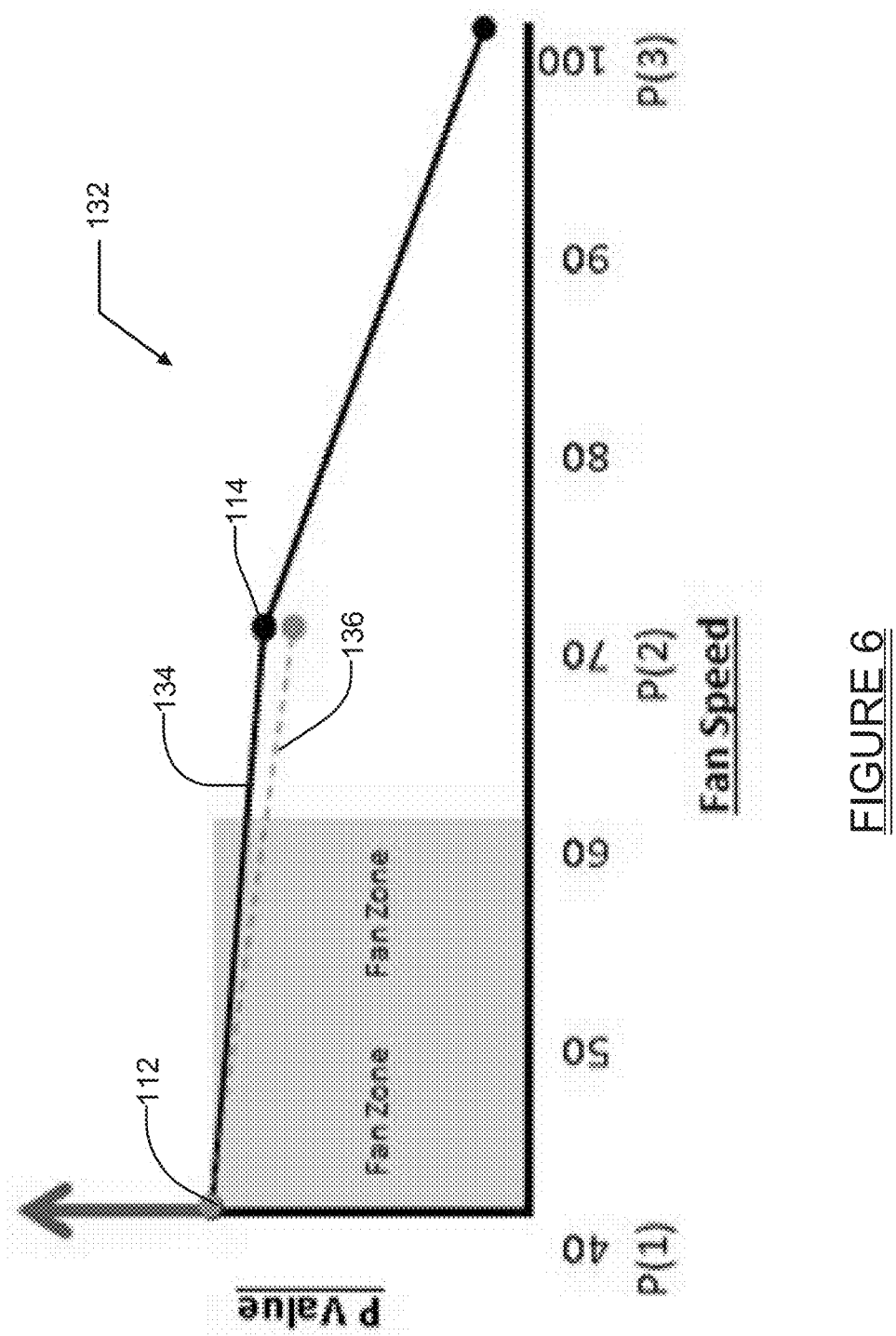

Referring to graph 132 of FIG. 6, the PID controller 14 will increase the value of P(1) (point 112) if the table slope 134 between P(1) (112) and P(2) (114) is less negative than the limited slope calculation 136.

Decrease P (Increase Response) Determination Window 1

Figure 7:
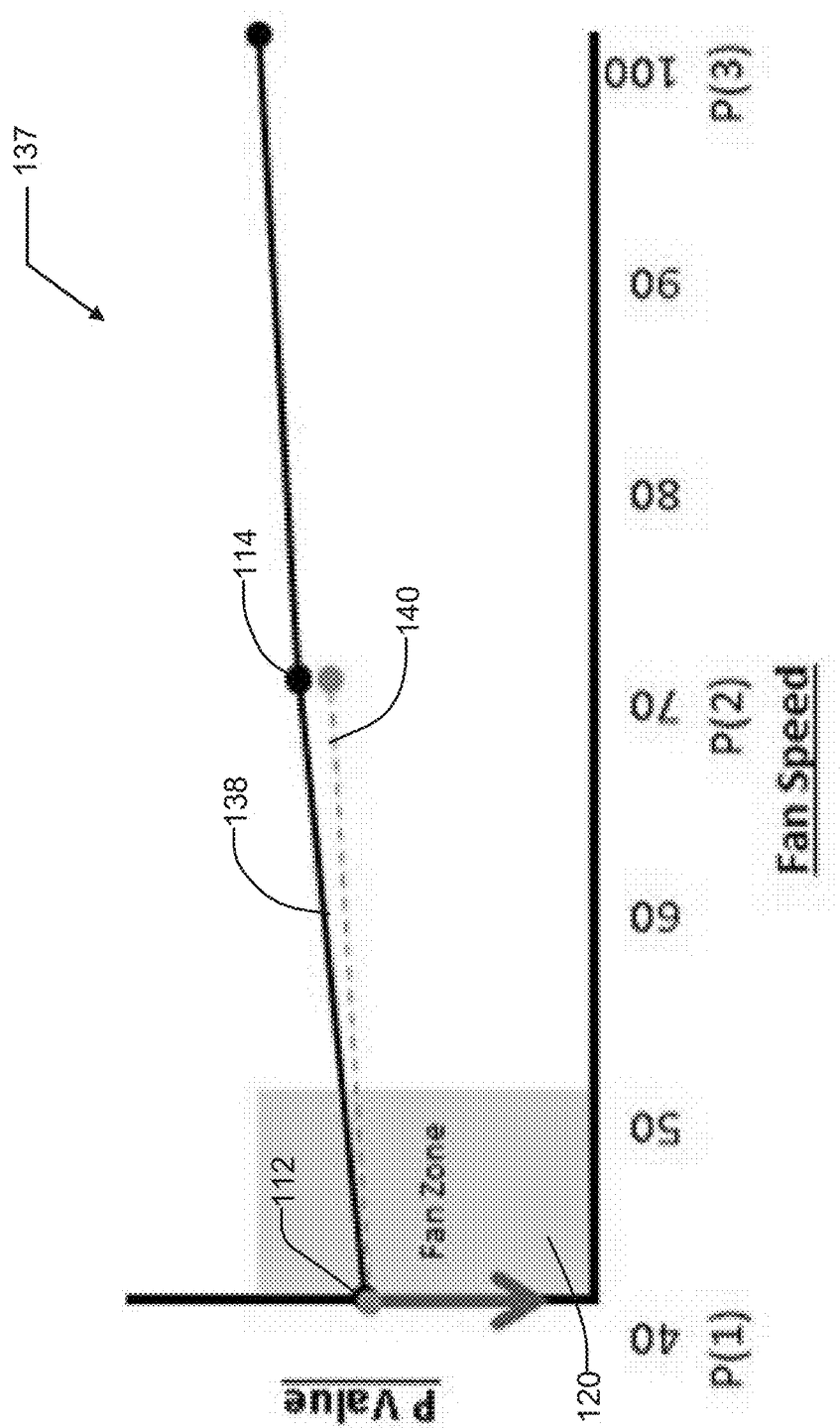

Referring to graph 137 FIG. 7, the PID controller 14 will decrease the value of P(1) (point 112) if the table slope 138 between P(1) (112) and P(2) (point 114) is greater than the limited slope calculation (140) and the fan speed is in Window 1 (area 120).

Decrease P (Increase Response) Determination Window 2

Figure 8:
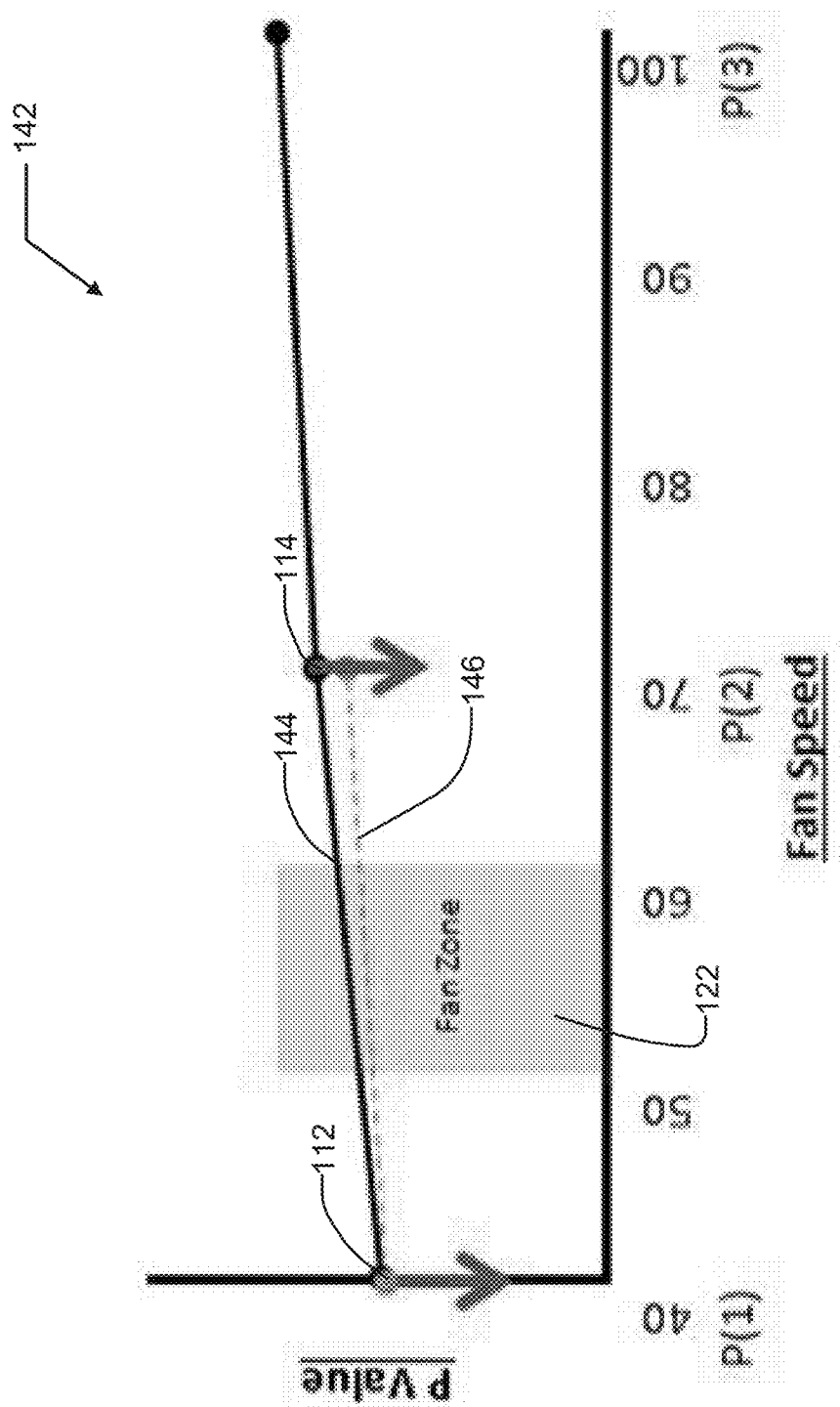

Referring to graph 142 of FIG. 8, the PID controller 14 will decrease the value of P(1) (point 112) and P(2) (point 114) if the table slope 144 between P(1) and P(2) is greater than the limited slope calculation 146, and the unit fan 24 speed is in Window 2 (area 122). The values of P(1) and P(2) will be adjusted based on a normalization multiplier as a function of unit fan 24 speed.

Decrease P (Increase Response) Determination Window 3

Figure 9:
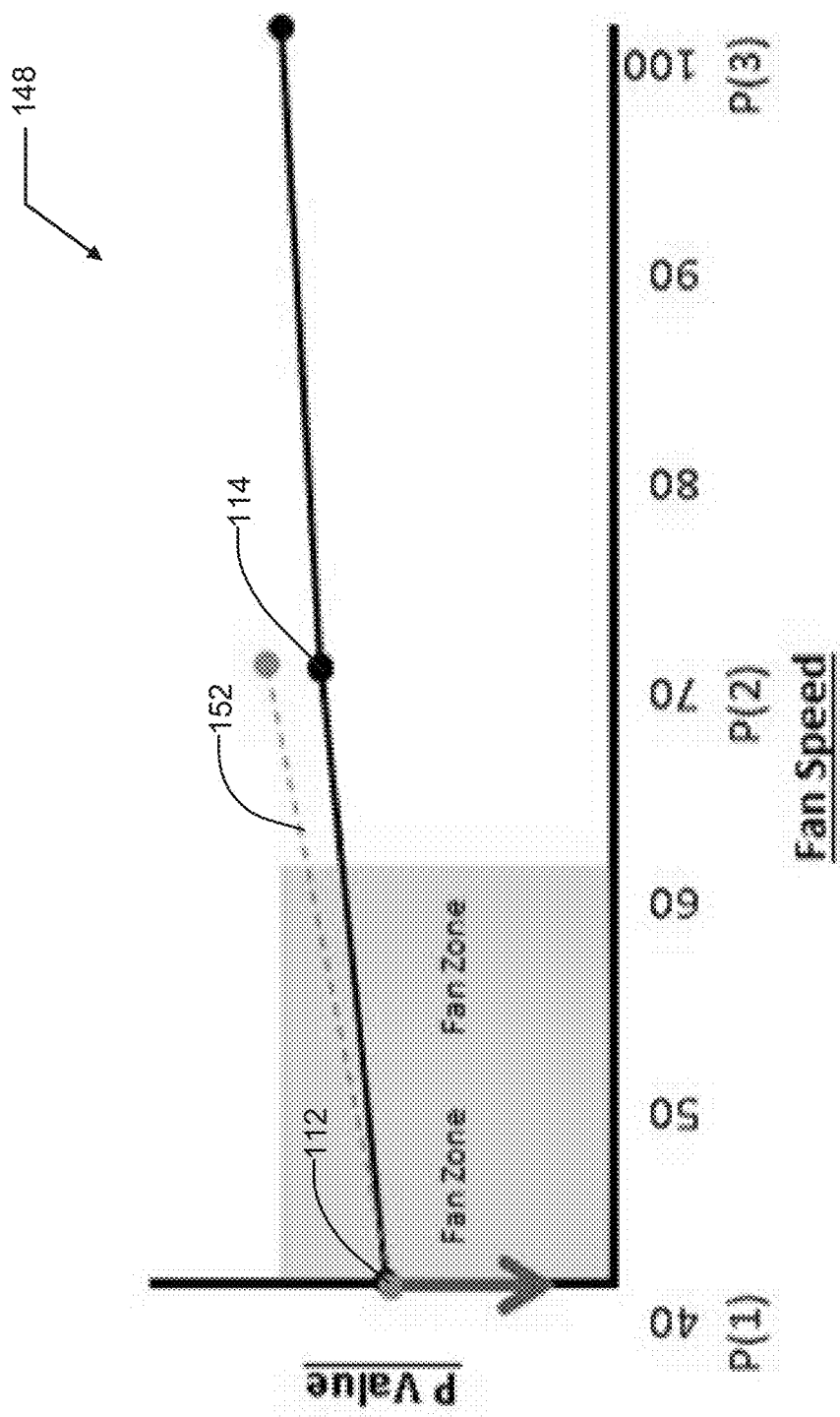

Referring to graph 148 of FIG. 9, the PID controller 14 will decrease the value of P(1) (point 112) if the table slope 150 between P(1) and P(2) (114) is less than the limited slope calculation 152. FIG. 9a illustrates a table which indicates which graphs of FIGS. 4-9 may be referred to for an understanding of how the I and D gains are adjusted.

Medium 1 Fan Speed Valve Adapts

Figure 10:
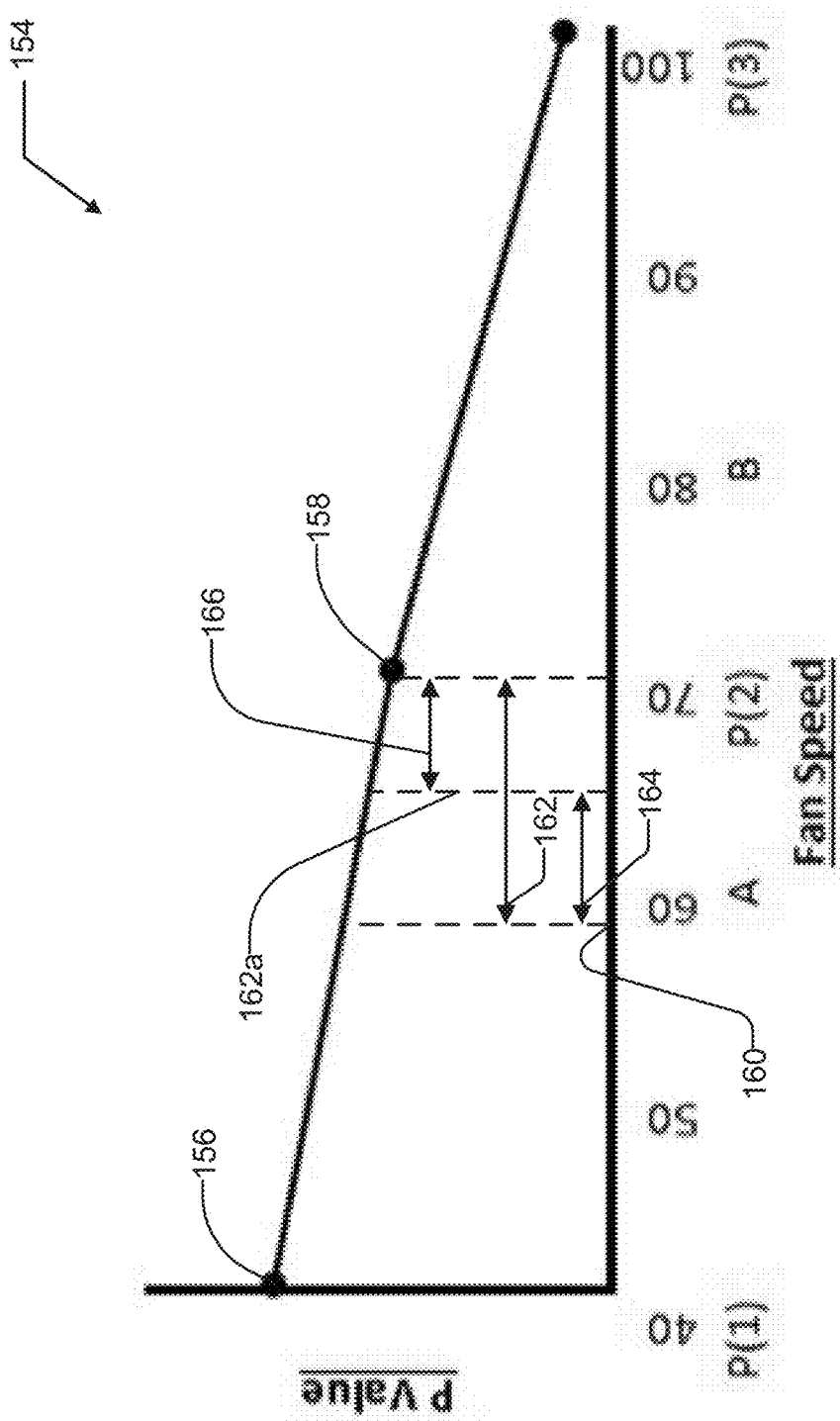
FIG. 10 is a graph illustrating a sample table which is used to explain the medium 1 fan speed adapts region of operation and how the windows are constructed within this region.

Referring to graph 154 in FIG. 10, the point between the low unit fan 24 speed 156 and medium fan speed 158 will be a changeable (i.e., modifiable) point/parameter (Point A), identified by reference number 160. The region between Point A (point 160) and the medium fan speed (point 158) will be known as the "medium 1 fan speed adapts" region, indicated by arrow 162. Window 1 is the zone between Point A (point 160) and the midpoint 162*a* of the medium 1 fan speed adapts region, as indicted by arrow 164. Window 2 is the zone between the midpoint (162*a*) of the medium 1 fan speed adapts region 162 to the medium fan speed (point 158), which is indicated by arrow 166. Window 3 will include window 1 and window 2.

Increase P (Reduce Response) Determination Window 1

Figure 11:
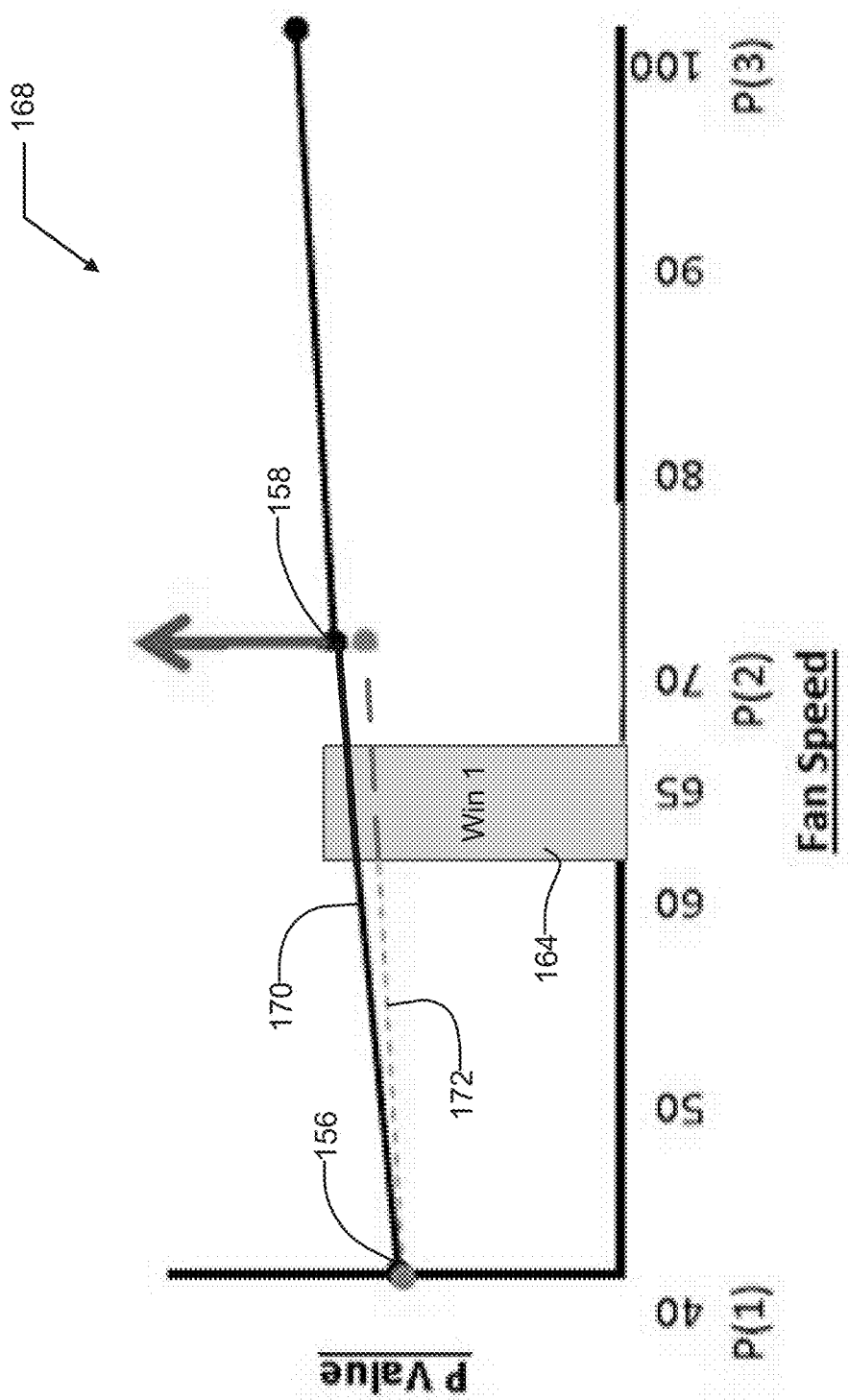
FIGS. 11-16 show graphs to illustrate medium 1 fan speed adapts, and more particularly how the proportional gain is controlled by adjusting one or more points relating to fan speed based on a comparison of connecting line slopes and limited slope calculations.

Referring to graph 168 of FIG. 11, the PID controller 14 will increase P(2) (point 158) if the table slope 170 between P(1) (point 156) and P(2) is greater than the limited slope calculation 172 and the fan speed is in window 1 (area 164).

Increase P (Reduce Response) Determination Window 2

Figure 12:
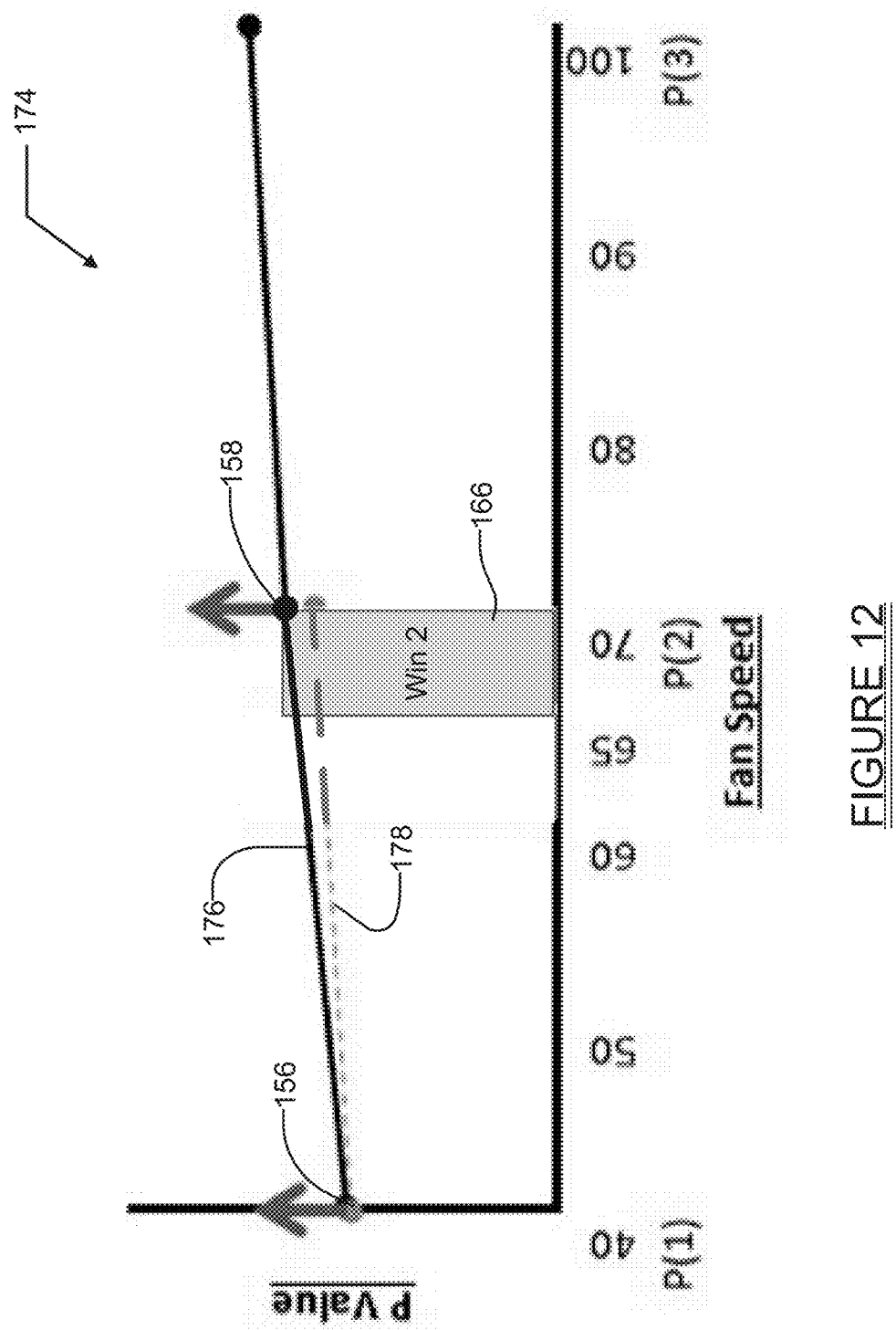

Referring to graph of FIG. 12, the PID controller 14 will increase P(1) (156) and P(2) (158) if the table slope 176 between P(1) and P(2) is greater than the limited slope calculation 178 and the unit fan 24 speed is in window 2 (area 166). The values of P(1) and P(2) will be adjusted by the PID controller 14 based on a normalization multiplier as a function of the unit fan 24 speed.

Increase P (Reduce Response) Determination Window 3

Figure 13:
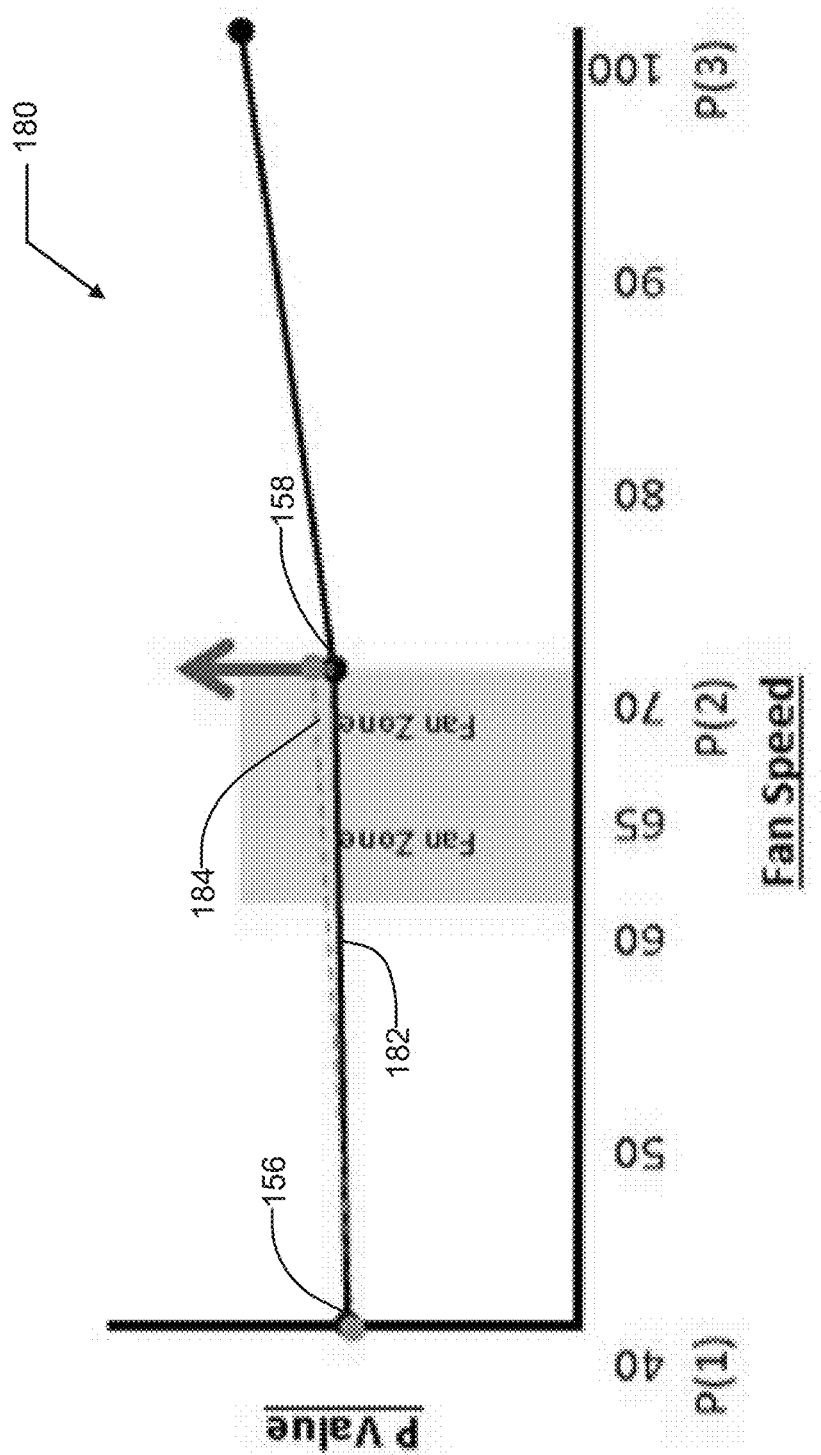

Referring to graph 180 of FIG. 13, the PID controller 14 will increase the value of P(2) (point 158) if the table slope 182 between P(1) (156) and P(2) (158) is less than the limited slope calculation 184.

Decrease P (Increase Response) Determination Window 1

Figure 14:
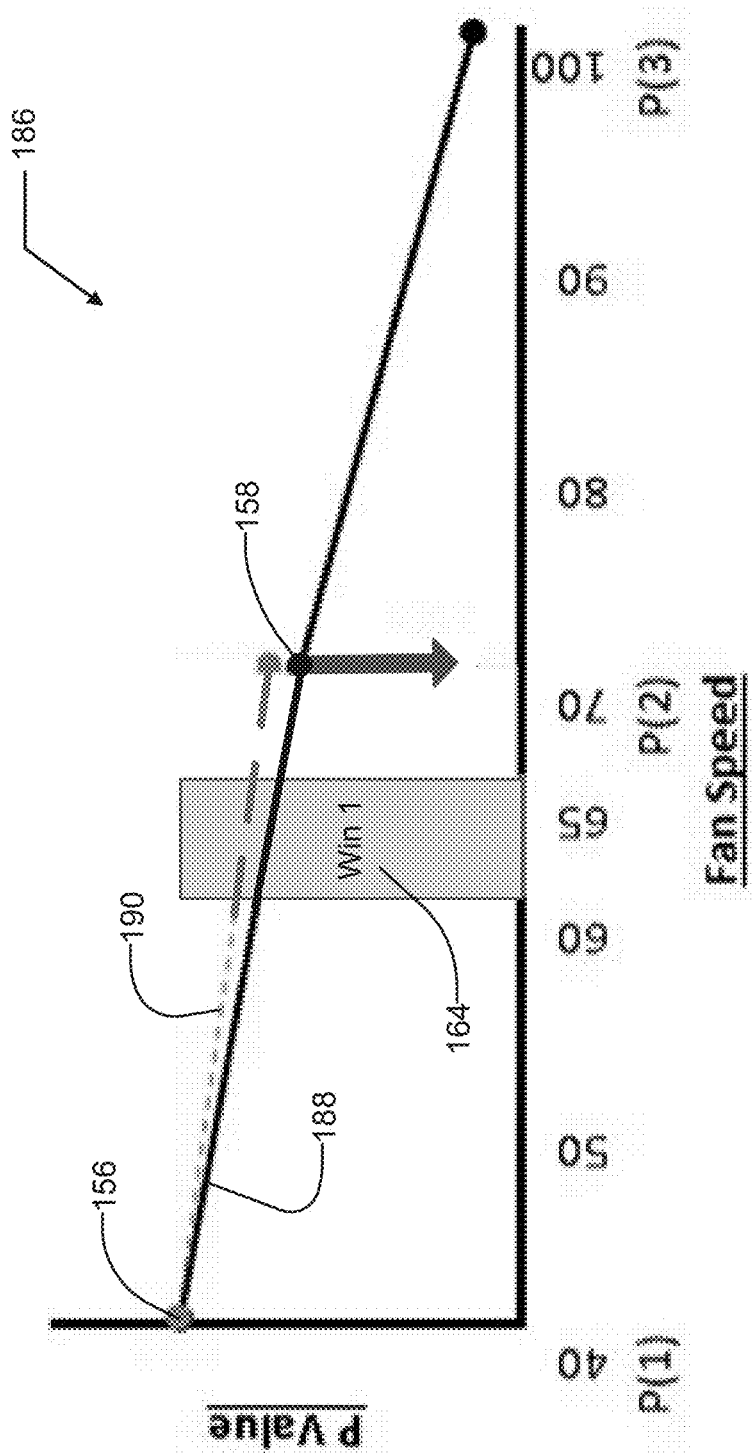

Referring to graph 186 of FIG. 14, the PID controller 14 will decrease P(2) (point 158) if the table slope 188 between P(1) (156) and P(2) (158) is more negative than the limited slope calculation 190 and the unit fan 24 speed is in window 1 (area 164).

Decrease P (Increase Response) Determination Window 2

Figure 15:
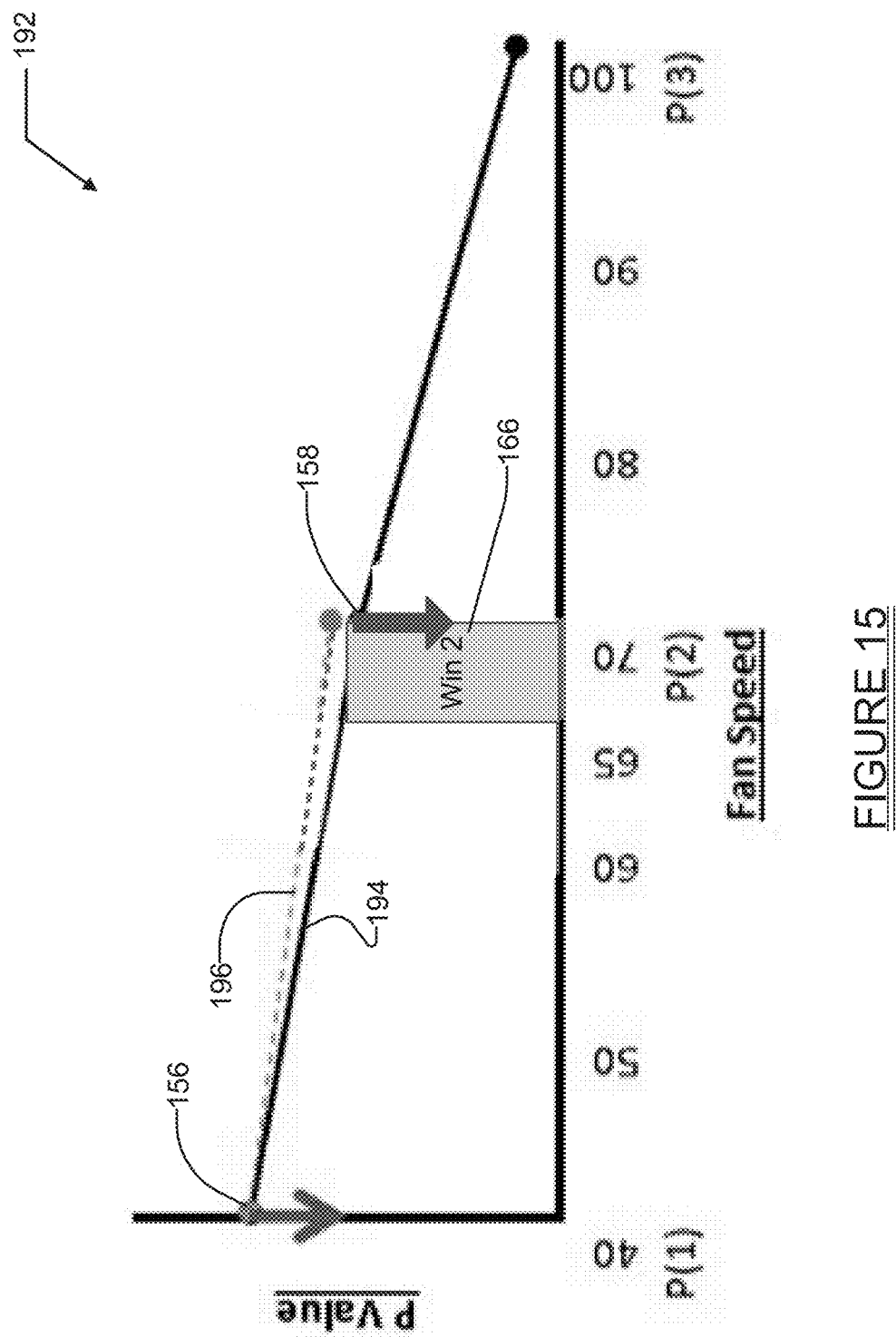

Referring to graph 192 of FIG. 15, the PID controller 14 will decrease the values of P(1) (156) and P(2) (158) if the table slope 194 between P(1) and P(2) is more negative than the limited slope calculation 196 and the unit fan 24 speed is in window 2 (area 166). The values of P(1) and P(2) will be adjusted based on a normalization multiplier as a function of the unit fan 24 speed.

Decrease P (Increase Response) Determination Window 3

Figure 16:
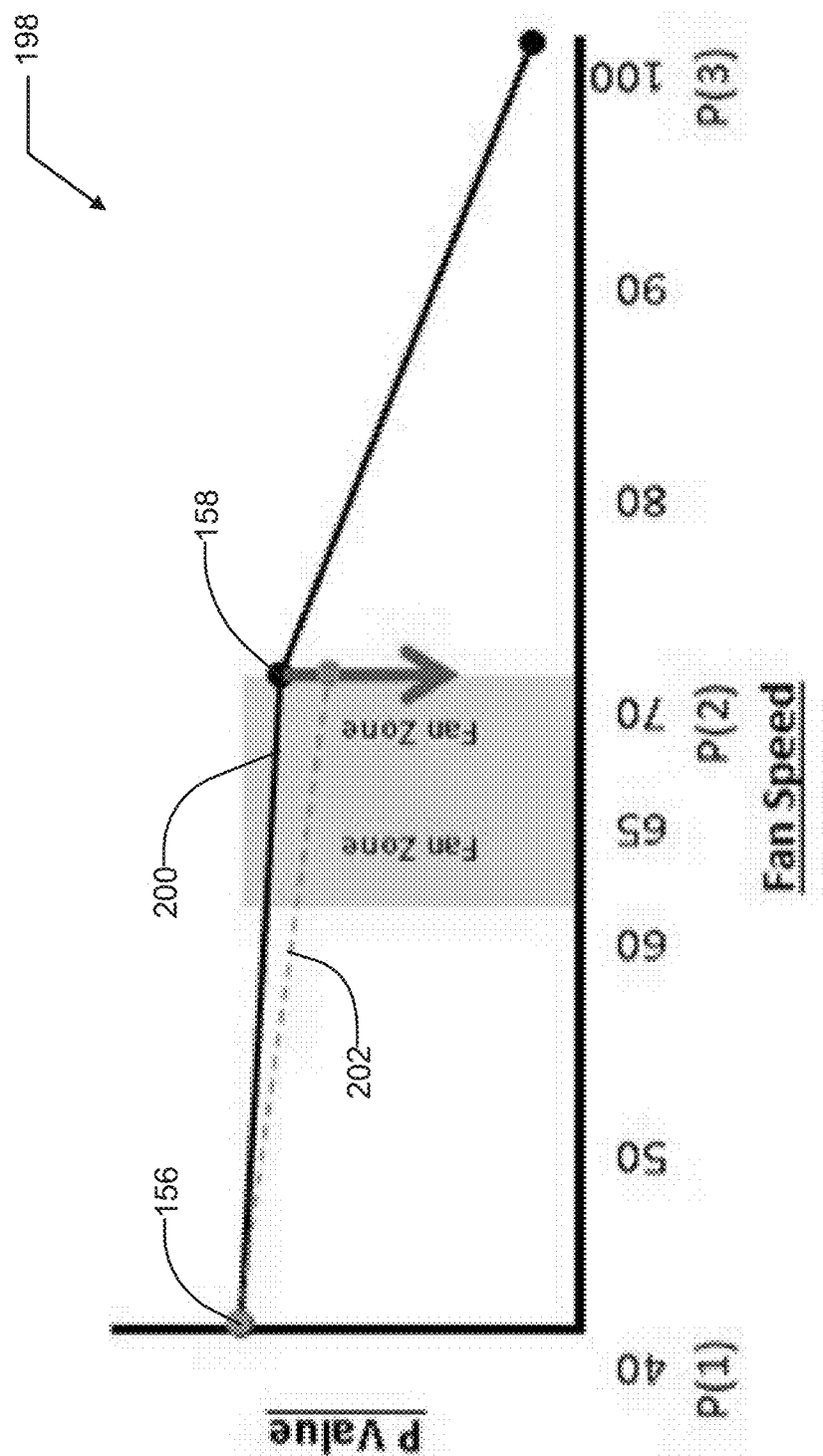

Referring to graph 198 of FIG. 16, the PID controller 14 will decrease the value of P(2) (point 158) if the table slope 200 between P(1) (156) and P(2) is less negative than the limited slope calculation 202. Table 204 of FIG. 16*a* illustrates actions with regard to I and P for each of the above described windows.

Medium 2 Fan Speed Valve Adapts

Figure 17:
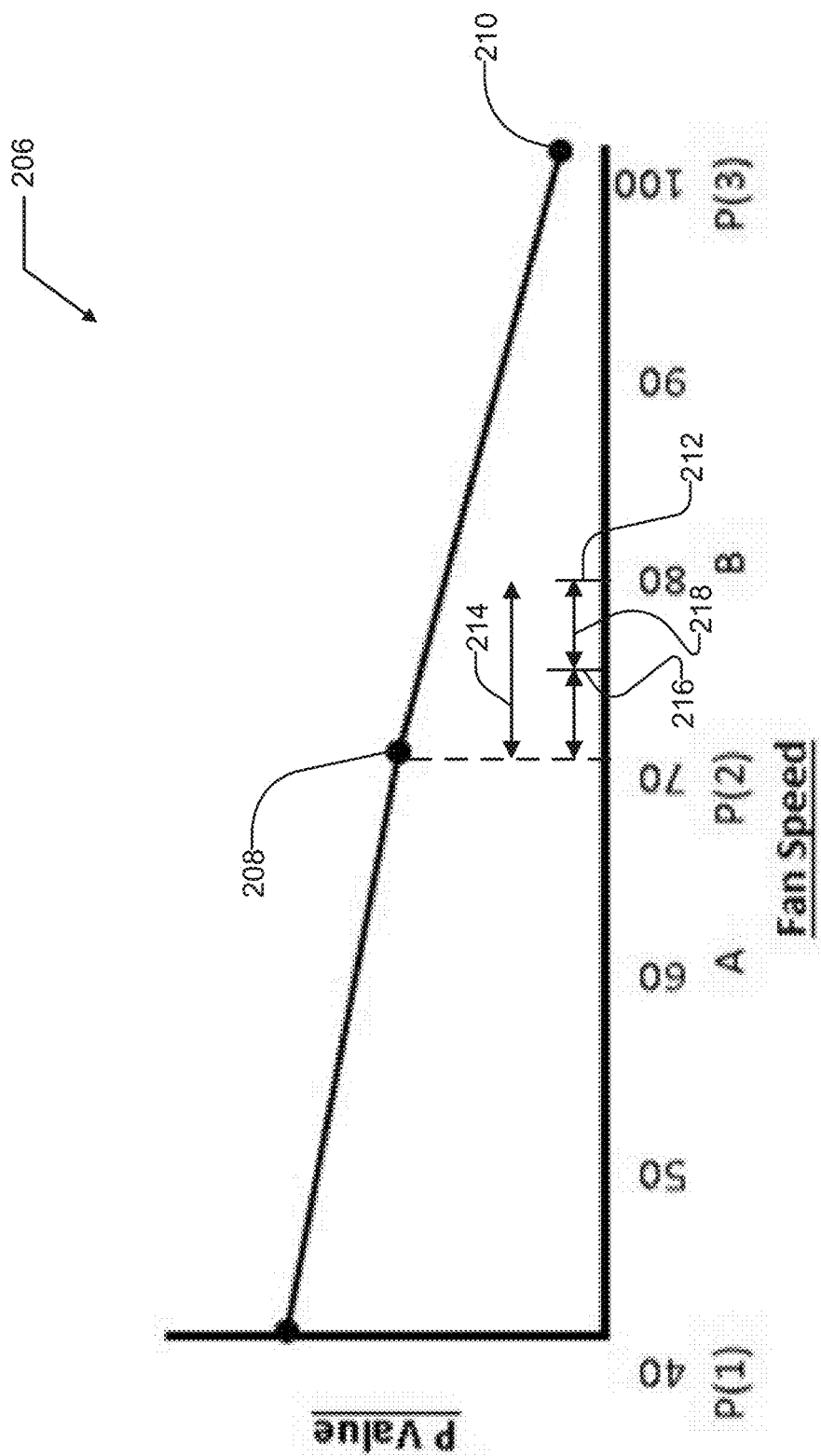
FIG. 17 is a graph illustrating a sample table which is used to explain the medium 2 fan speed adapts region of operation and how the windows are constructed within this region.

Referring to graph 206 of FIG. 17, the point "B" between the medium fan speed P(2) (208) and high fan speed P(3) (210) will be a changeable parameter identified in the figure by number 212. The region between medium fan speed P(2) (reference number 208) and Point B (reference number 212) will be known as the medium 2 fan speed adapts region 214. It will be appreciated that point 212 in FIG. 17 represents the same point as point 117 in FIG. 3 (i.e., the medium 2 fan speed). Window 1 is identified by arrow 216 as the zone between the medium fan speed P(2) and the midpoint of the medium 2 fan speed adapts region 214. Window 2 is identified by arrow 218 as the zone between the midpoint of the medium 2 fan speed adapts region to Point B (point 210). Window 3 includes Window 1 and Window 2.

Increase P (Decrease Response) Determination Window 1

Figure 18:
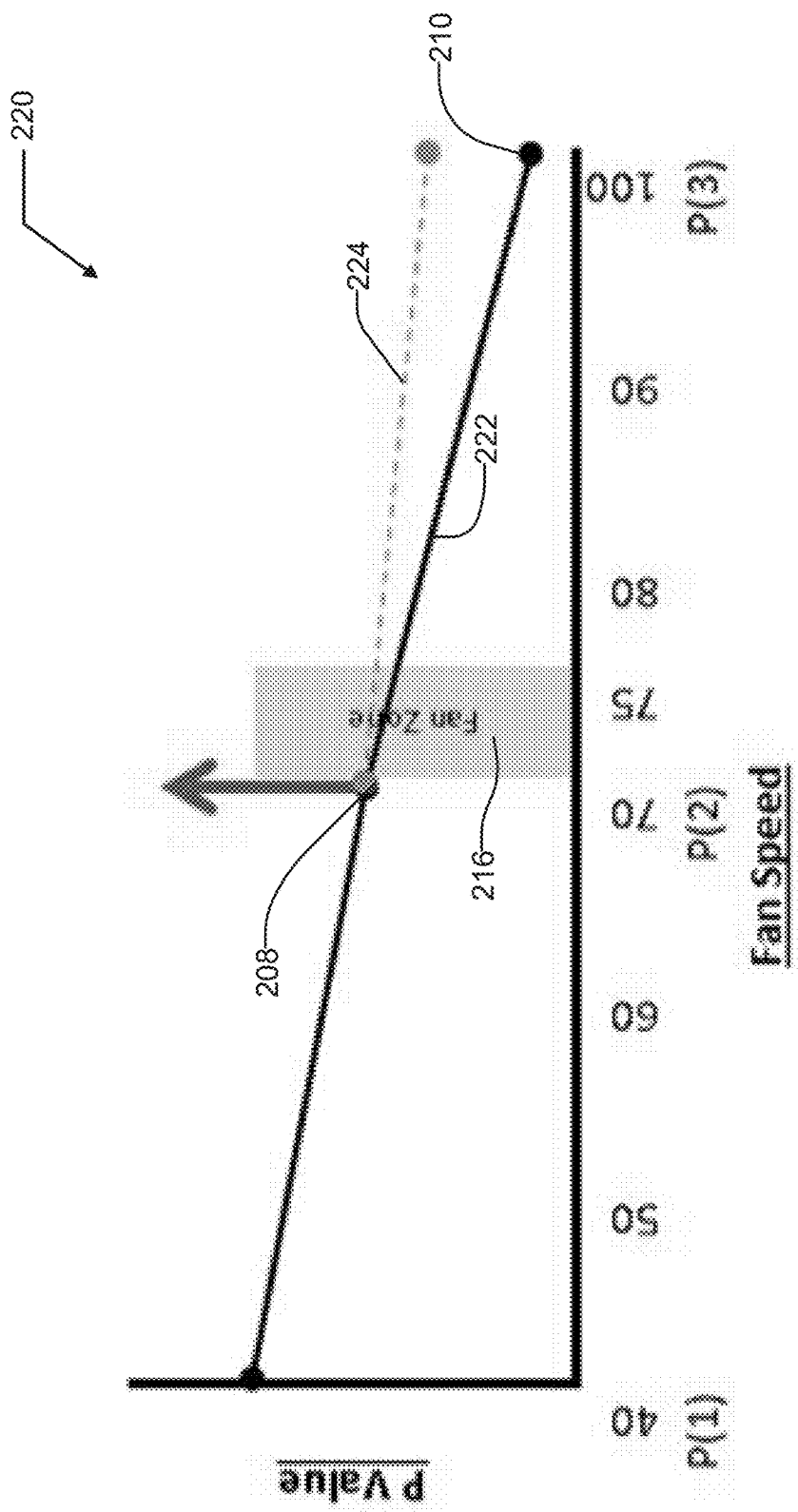
FIGS. 18-23 show graphs to illustrate medium 2 fan speed adapts, and more particularly how the proportional gain is controlled by adjusting one or more points relating to fan speed based on a comparison of connecting line slopes and limited slope calculations.

Referring to graph 220 of FIG. 18, the PID controller 14 will increase the value of P(2) (208) if the table slope 222 between P(2) and P(3) (210) is more negative than the limited slope calculation 224 and the unit fan 24 speed is in window 1 (216).

Increase P (Decrease Response) Determination Window 2

Figure 19:
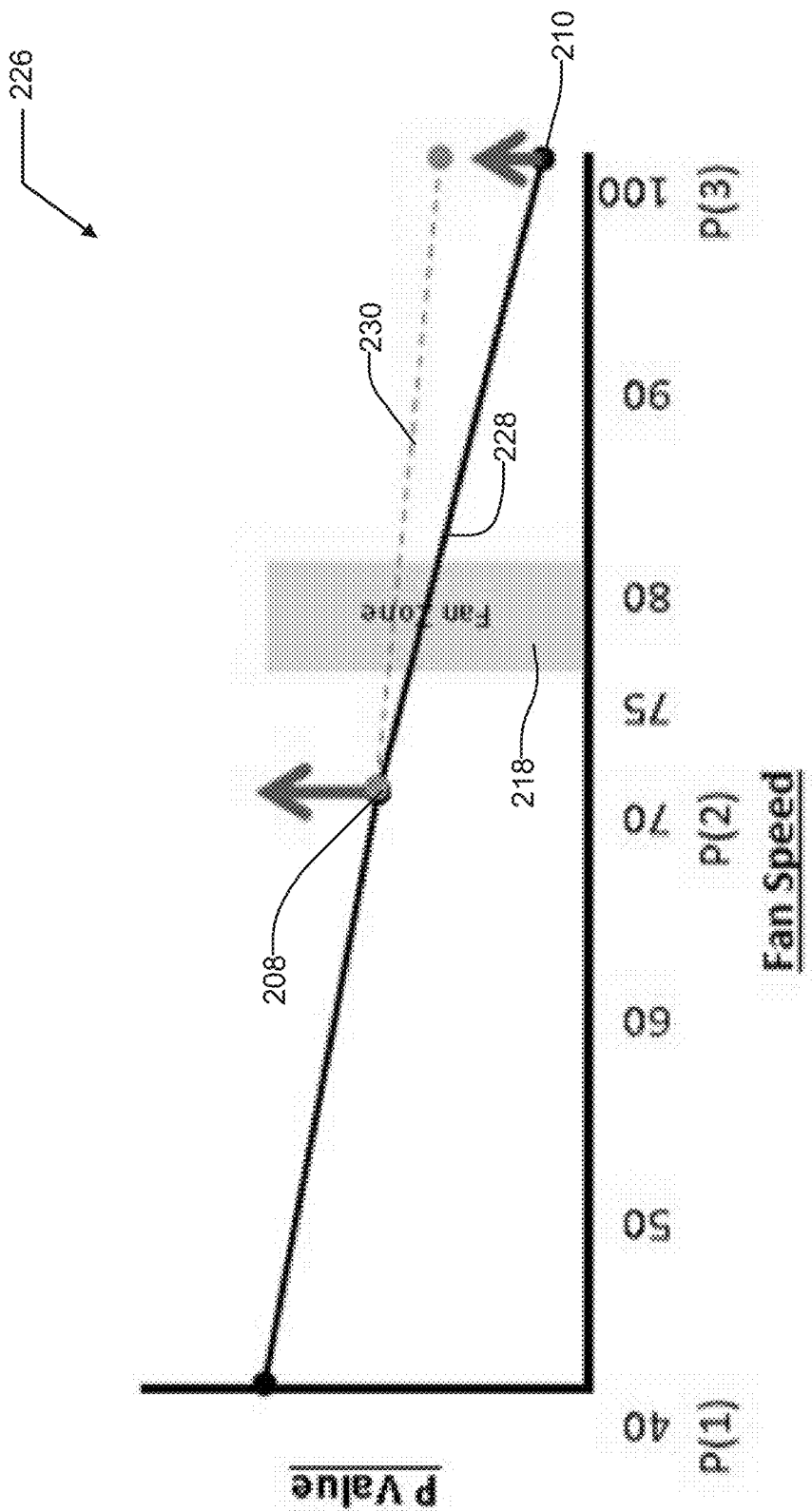

Referring to graph 226 of FIG. 19, the PID controller 14 will increase the values of P(2) (208) and P(3) (210) if the table slope 228 between P(2) and P(3) is more negative than the limited slope calculation 230, and the unit fan 24 speed is in window 2 (218). The values of P(2) and P(3) will be adjusted based on a normalization multiplier as a function of the unit fan 24 speed.

Increase P (Decrease Response) Determination Window 3

Figure 20:
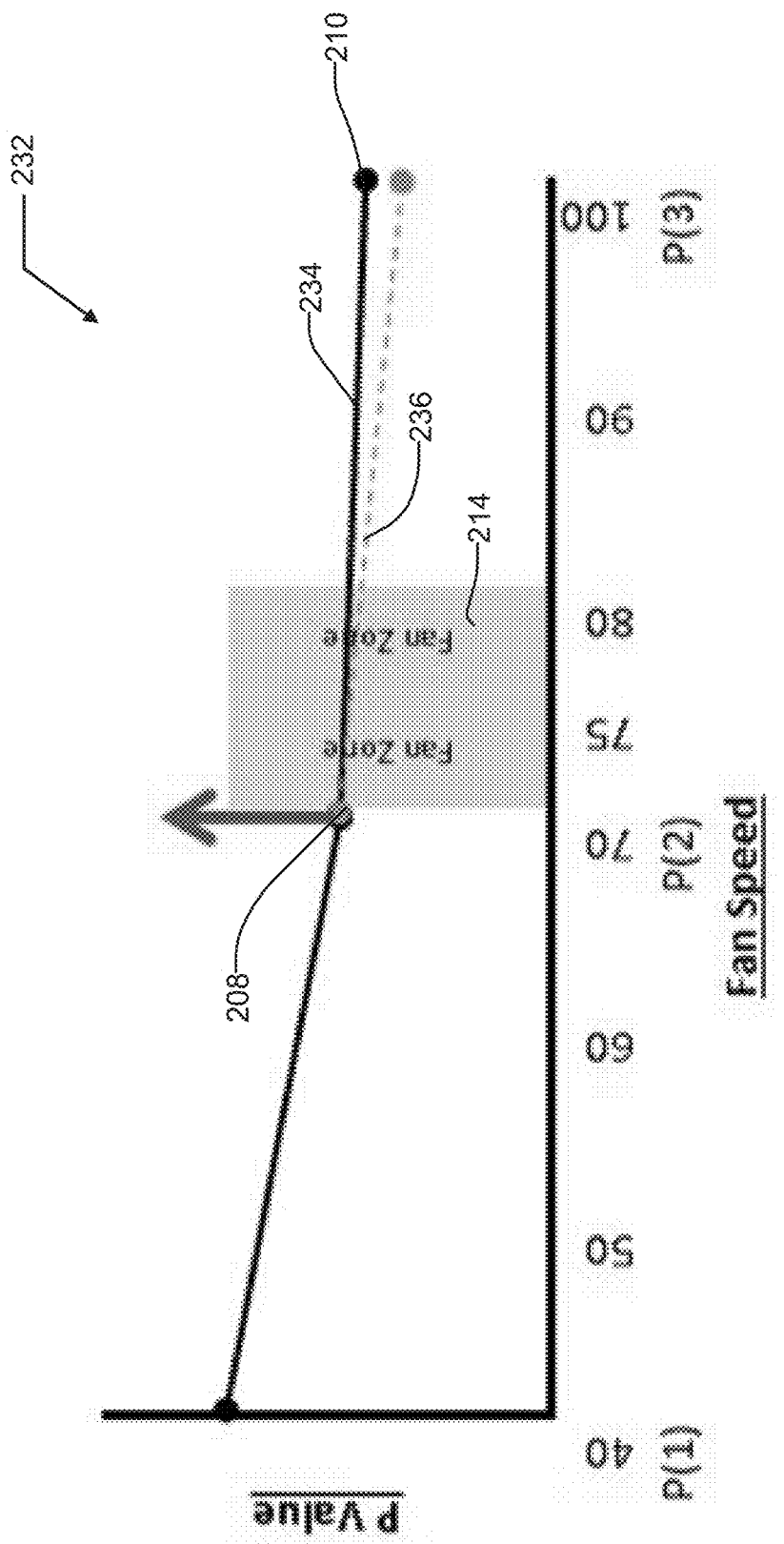

Referring to graph 232 in FIG. 20, the PID controller 14 will increase P(2) (208) if the table slope 234 between P(2) and P(3) (210) is less negative than the limited slope calculation 236.

Decrease P (Increase Response) Determination Window 1

Figure 21:
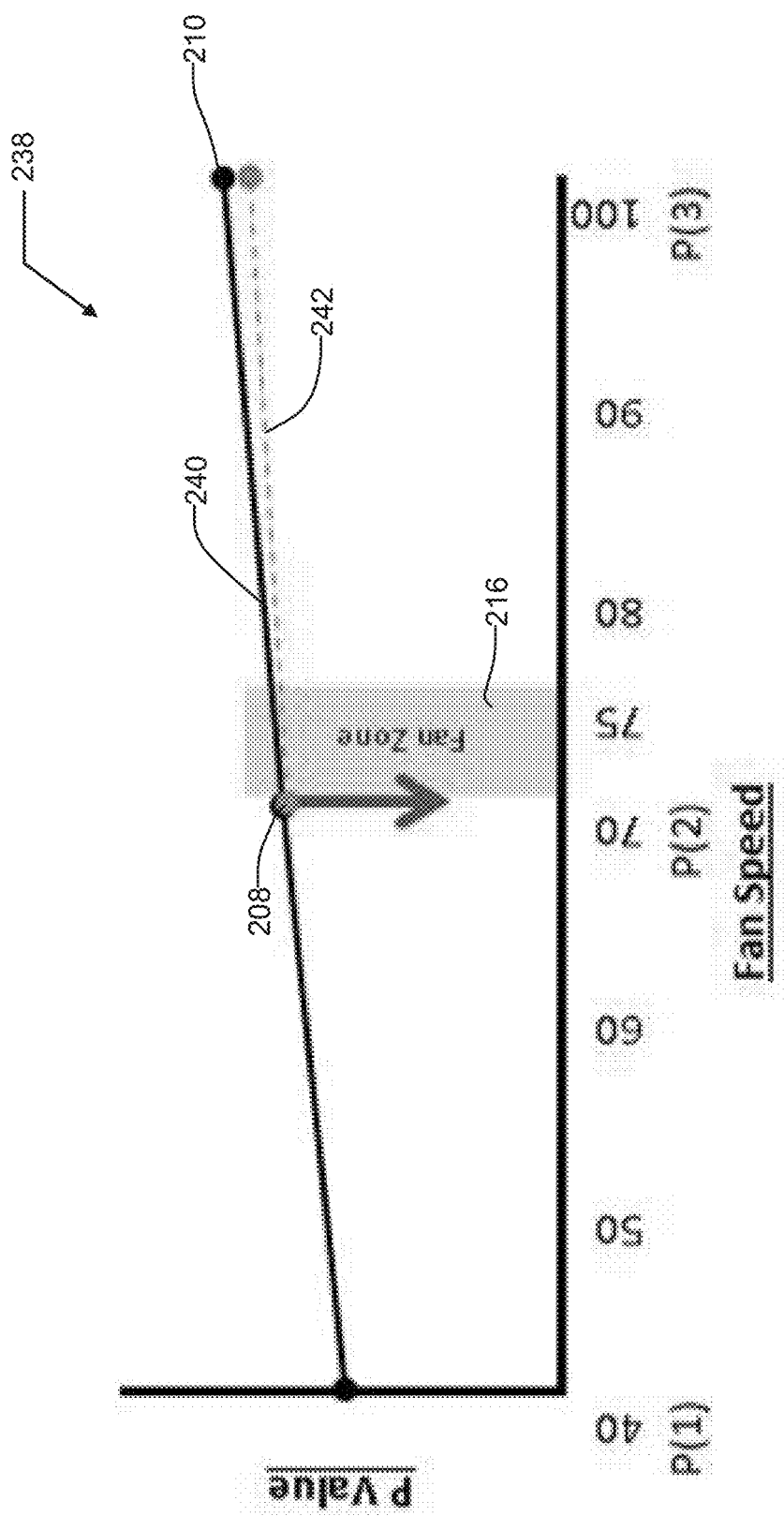

Referring to graph 238 of FIG. 21, the PID controller 14 will decrease P(2) (208) if the table slope 240 between P(2) and P(3) (210) is greater than the limited slope calculation 242, and the unit fan 24 speed is in window 1 (216).

Decrease P (Increase Response) Determination Window 2

Figure 22:
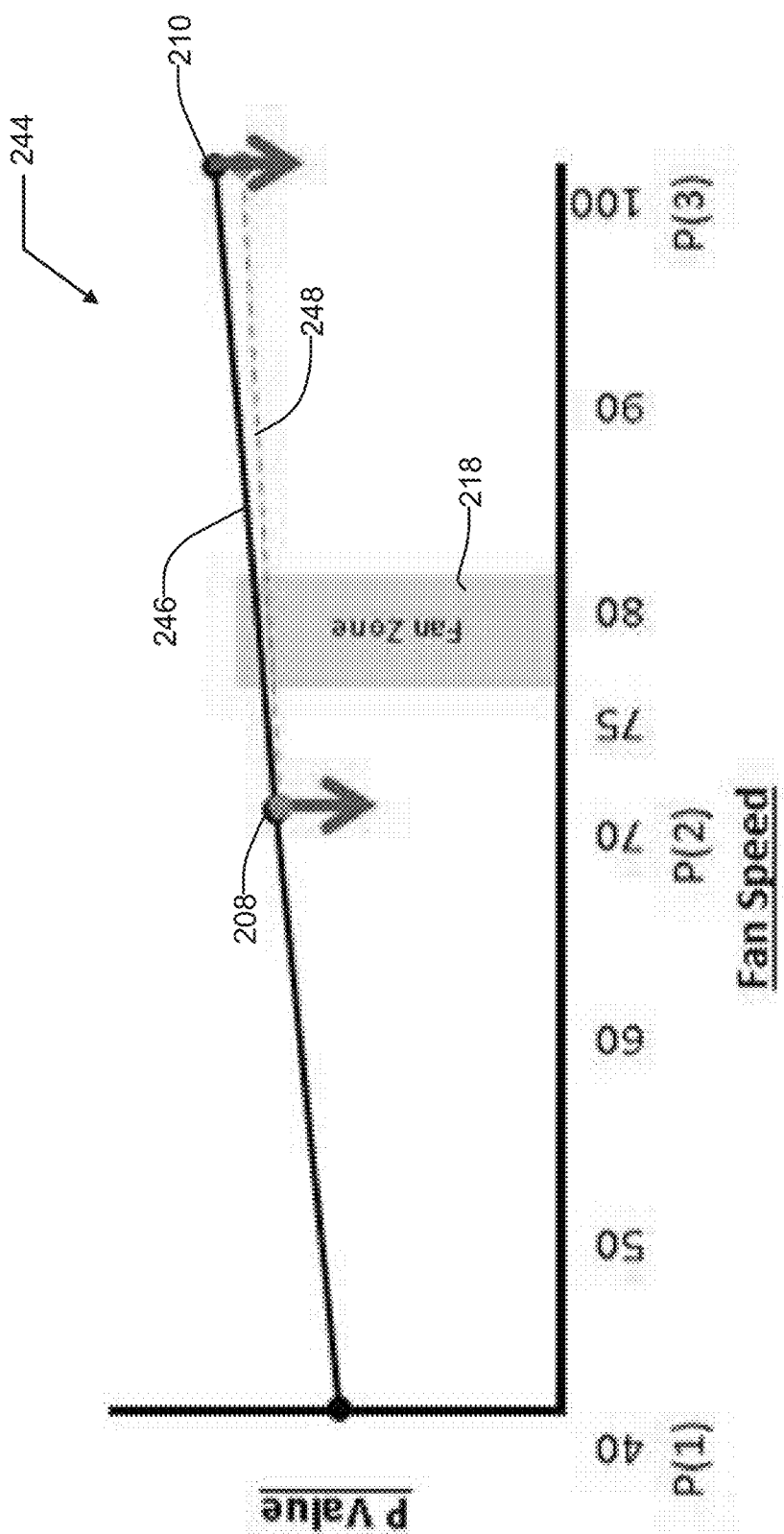

Referring to graph 244 of FIG. 22, the PID controller 14 will decrease the values of P(2) (208) and P(3) (210) if the table slope 246 between P(2) and P(3) is greater than the limited slope calculation 248 and the unit fan 24 speed is in window 2 (218). The values of P(2) and P(3) will be adjusted based on a normalization multiplier as a function of fan speed.

Decrease P (Increase Response) Determination Window 3

Figure 23:
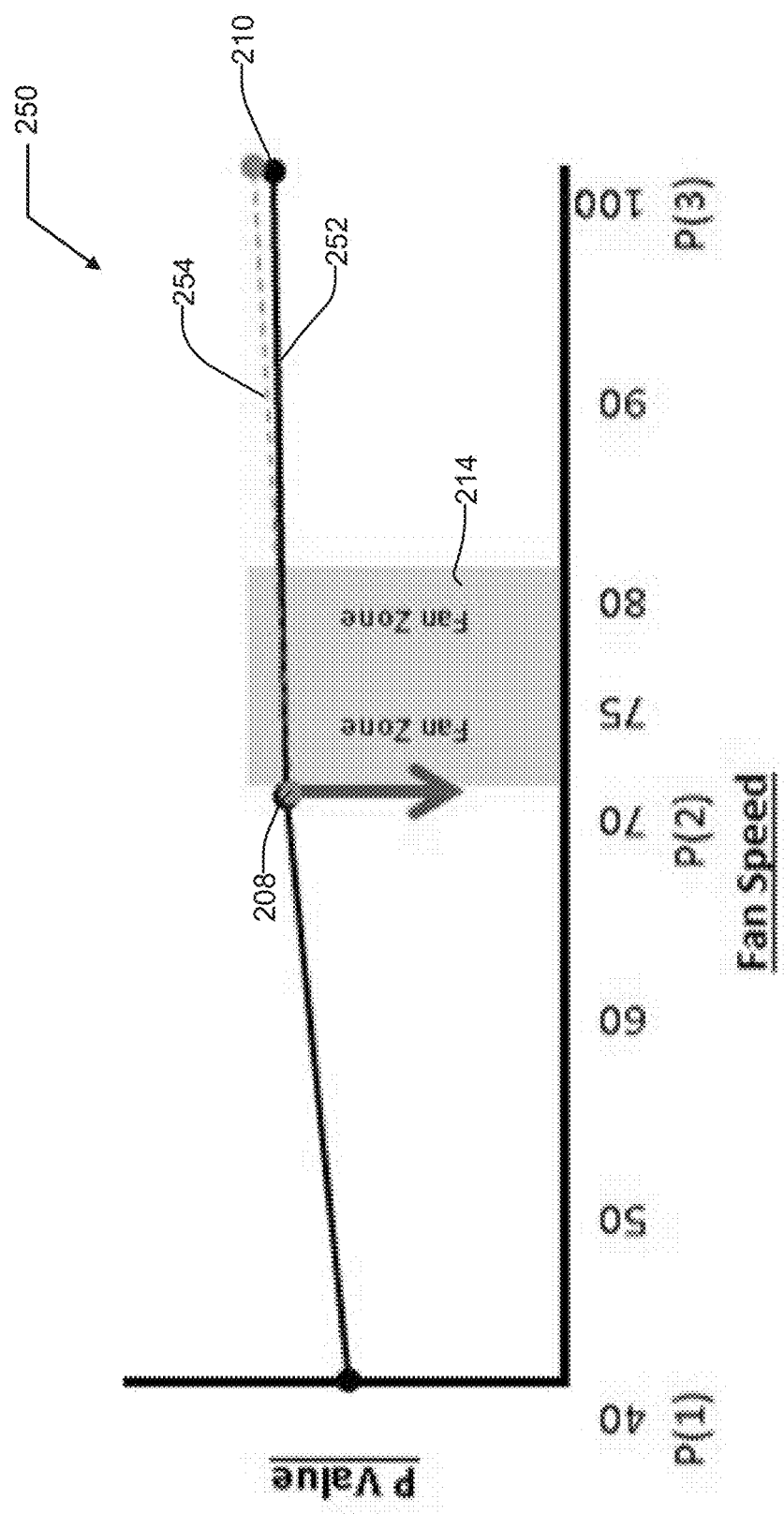

Referring to graph 250 of FIG. 23, the PID controller 14 will decrease P(2) (208) if the table slope 252 between P(2) and P(3) (210) is less than the limited slope calculation 254. Table C of FIG. 23*a* indicates actions for P and I for each of the above-described windows discussed in FIGS. 18-23.

High Fan Speed Valve Adapts

Figure 24:
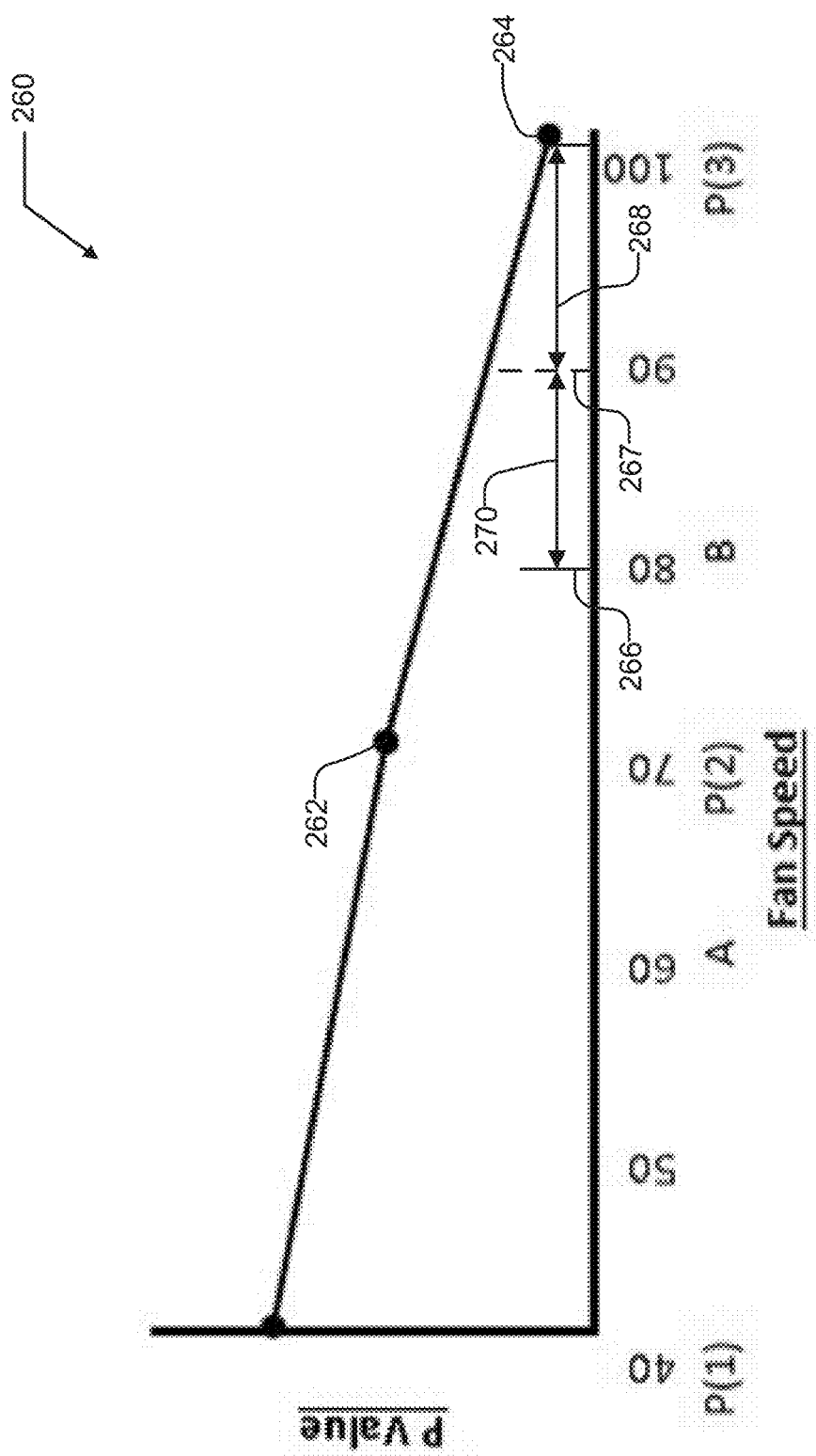
FIG. 24 is a graph illustrating a sample table which is used to explain the high fan speed valve adapts region of operation and how the windows are constructed within this region.

Referring to FIG. 24, graph 260 illustrates that the point between the medium fan speed 262 and high fan speed 264 point (point P(3)) will be a changeable parameter (Point B) (point 266). The region between Point B (point 266) and the high fan speed point P(3) (identified by reference number 264) will be known as the high fan speed adapts region. Window 1 will be the area 268 between the midpoint of the high fan speed adapts region to the high fan speed axis (264). Window 2 will be the area 270 between point B (266) and the midpoint (267) of the high fan speed adapts region. Window 3 will include Window 1 and Window 2.

Increase P (Decrease Response) Determination Window 1

Figure 25:
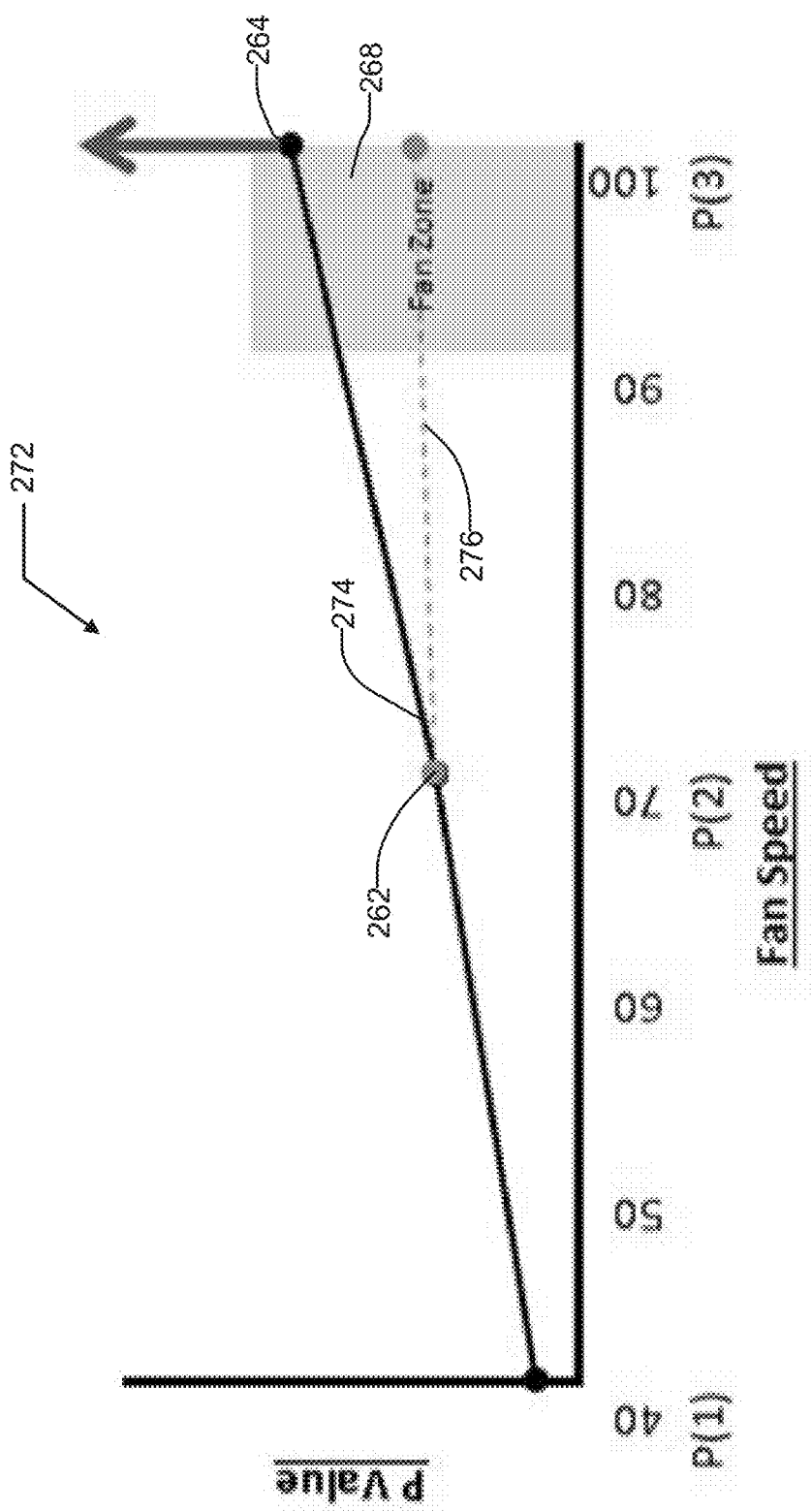

Referring to graph 272 in FIG. 25, the PID controller 14 will increase P(3) if the table slope 274 between P(2) (262) and P(3) (264) is greater than the limited slope calculation 276 and the unit fan 24 speed is in window 1 (268).

Increase P Determination Window 2 (High Fan Speed)

Figure 26:
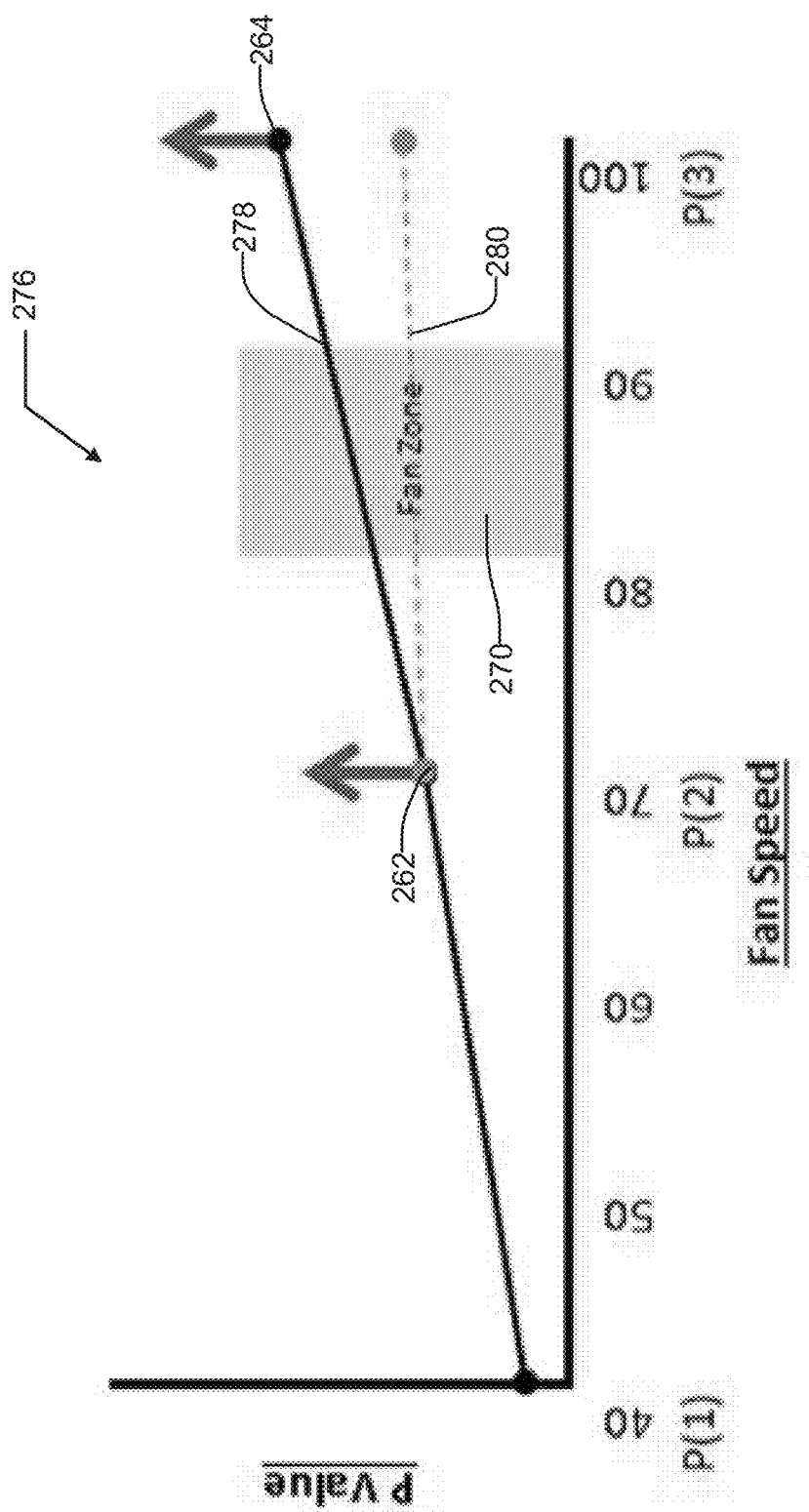

Referring to graph 276 of FIG. 26, the PID controller 14 will increase the values of P(2) (262) and P(3) (264) if the table slope 278 between P(2) and P(2) is greater than the limited slope calculation 280, and the unit fan 24 speed is in window 2 (area 270). The values of P(2) and P(3) will be adjusted based on a normalization multiplier as a function of fan speed.

Increase P Determination Window 3 (High Fan Speed)

Figure 27:
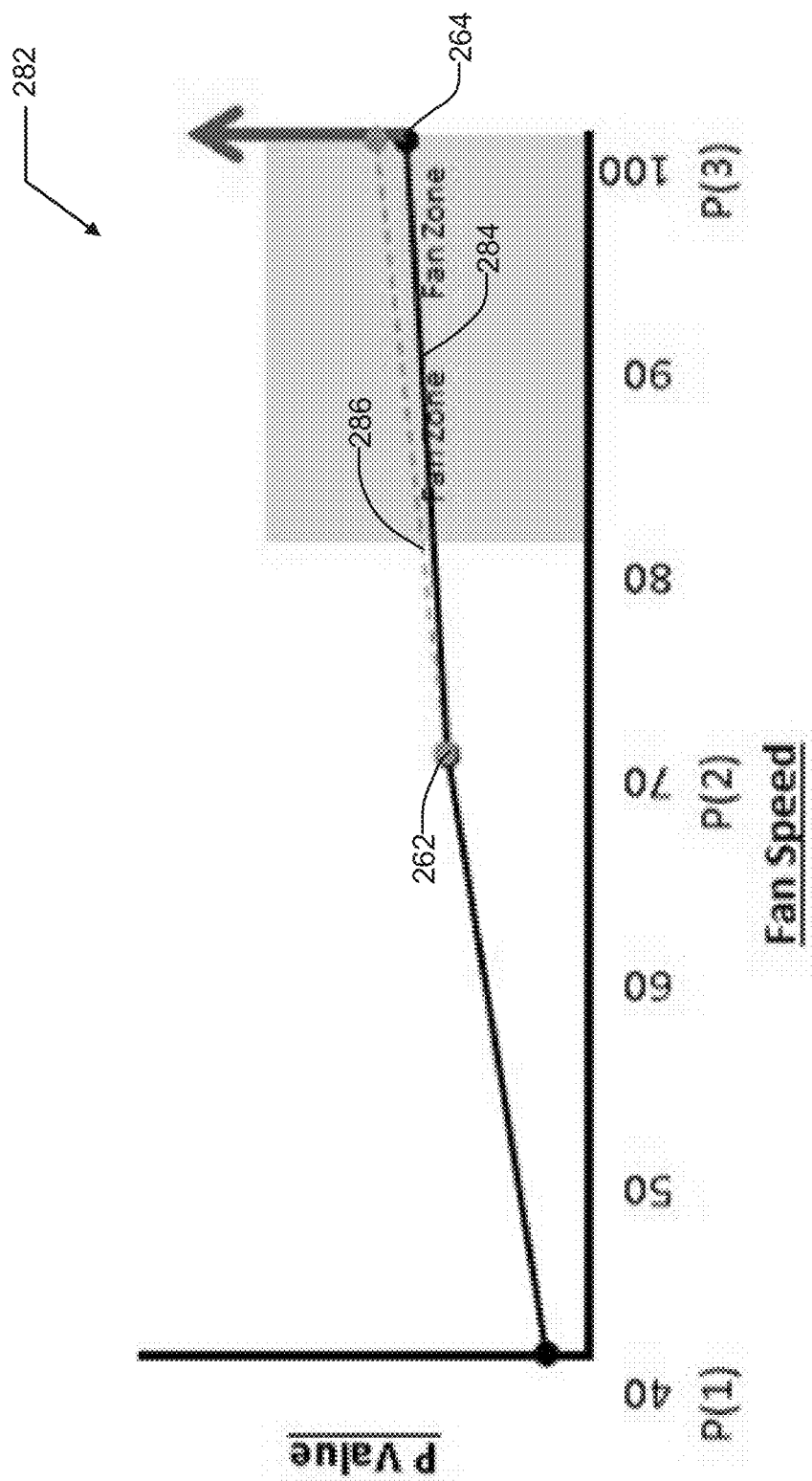

Referring to graph 282 of FIG. 27, the PID controller 14 will increase the value of P(3) (264) if the table slope 284 between P(2) (262) and P(3) is less than the limited slope calculation 286. The relevant region here is both window 1 (268) and window 2 (270).

Decrease P Determination Window 1 (High Fan Speed)

Referring to graph 288 FIG. 28, the PID controller 14 will decrease the value of P(3) (264) if the table slope 290 between P(2) (262) and P(3) is more negative than the limited slope calculation 292 and the unit fan 24 speed is in window 1 (268).

Decrease P Determination Window 2 (High Fan Speed)

Referring to graph 294 in FIG. 29, the PID controller 14 will decrease the values of P(2) (262) and P(3) (264) if the table slope 290 between P(2) and P(3) is more negative than the limited slope calculation 298, and the unit fan 24 speed is in window 2 (270). The values of P(2) and P(3) will be adjusted based on a normalization multiplier as a function of fan speed.

Decrease P Determination Window 3 (High Fan Speed)

Referring to graph 300 of FIG. 30, the PID controller 14 will decrease the value of P(3) (264) if the table slope 302 between P(2) (262) and P(3) is less negative than the limited slope calculation 304. The relevant region here is window 1 (268) and window 2 (270). Table D of FIG. 30a indicates actions for P and I for each of the above-described windows discussed in FIGS. 24-30.

The control over the fan speed, as noted earlier herein, is based on supply air temperature, and may make use of the same principles described above for the low fan speed valve adapts, medium 1 fan speed valve adapts, medium 2 fan speed valve adapts and high fan speed valve adapts regions. But in this instance, the corresponding regions will be a "low supply air temp adapts" region, a "medium 1 supply air temp adapts" region, a "medium 2 low supply air temp adapts" region, and a "high supply air temp adapts" region. In this manner the unit fan PID gains can be controlled along similar lines by comparing the table slope and the limited slope calculation within the various windows created for each of the adapts regions, and adjusting P(1) and/or P(2) depending on whether the limited slope calculation is more negative or less negative than the table slope. It will be appreciated then that the fan speed tables are similar to valve tables with supply air temperature replacing fan speed on the x-axis.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer room air conditioning (CRAG) unit incorporating a proportional, integral, derivative (PID) control system for controlling a cooling component of a cooling unit to assist in controlling a supply air temperature of air discharged from the CRAC unit, the system including:
    a supply air temperature sensor;
    a PID controller in communication with the supply air temperature sensor;
    a memory in communication with the PID controller;
    a plurality of look-up tables stored in the memory and setting forth different proportional "P", integral ("I") and derivative ("D") gains based on an operating variable associated with operation of the cooling component of the cooling unit;
    the cooling component including an electrically adjustable component being in communication with the PID controller and helping to control performance of the CRAG unit at least in part in response to the supply air temperature; and
    wherein the PID controller uses the look-up tables together with a limited slope calculation which defines projected behavior of the operating variable, to adjust at least one of the P, I and D gains in real time, in controlling the cooling component to modify performance of the CRAC unit.

2. The system of claim 1, further comprising a plurality of algorithms stored in the memory to help determine the gains to be used in controlling the cooling component.

3. The system of claim 2, wherein the limited slope calculation defines the projected behavior of the operating variable, to determine different P, I and D gains to be used in controlling the PID controller within a plurality of different operating regions of the operating variable.

4. The system of claim 1, wherein the cooling component controlled by the system comprises a chilled water (CW) valve which controls a flow of chilled water to the CRAC unit.

5. The system of claim 1, wherein the cooling component controlled by the system comprises a motor driven unit fan operably associated with the cooling unit.

6. The system of claim 1, wherein the system demarcates a plurality of distinct operating points and operating regions for controlling the P, I and D gains.

7. A computer room air conditioning (CRAC) unit incorporating a proportional, integral, derivative (PID) control system for controlling a cooling component of the CRAC unit to assist in controlling a supply air temperature of air being discharged from the CRAC unit, the system including:
    a PID controller;
    a sensor configured to sense a temperature of air associated with operation of the CRAC unit and to provide an electrical signal to the PID controller;
    a memory in communication with the PID controller;
    a plurality of look-up tables stored in the memory and setting forth different proportional ("P"), integral ("I") and derivative ("D") gains based on an operating variable associated with operation of the cooling component;
    a plurality of algorithms stored in the memory to help determine the gains to be used in controlling the cooling component;
    the cooling component including at least one of a motor driven unit fan and an electrically adjustable chilled water (CW) valve, and being in bi-directional electrical communication with the PID controller and responsive to electrical signals from the PID controller such that the PID controller controls the cooling component to control performance of the CRAC unit in accordance with the air temperature; and
    wherein the PID controller uses the look-up tables together with a limited slope calculation, wherein the limited slope calculation defines projected behavior of the operating variable to determine different P, I and D gains to be used by the PID controller in controlling performance of the CRAC unit, within a plurality of different operating regions of the operating variable.

8. The system of claim 7, wherein the cooling component controlled by the system comprises the electrically adjustable chilled water (CW) valve which controls a flow of chilled water to the CRAC unit, wherein the air temperature comprises a supply air temperature being discharged by the CRAC unit.

9. The system of claim 7, wherein the cooling component controlled by the system comprises the motor driven unit fan operably associated with the CRAC unit, wherein the air temperature comprises a remote air temperature at a load bank remote from the CRAC unit.

10. The system of claim 8, wherein the system demarcates a plurality of distinct operating points and operating regions for controlling the P, I and D gains, including:
   a predetermined low fan speed;
   a predetermined high fan speed;
   two predetermined medium fan speeds comprising medium 1 and medium 2 fan speeds, at points between the predetermined low fan speed and the predetermined high fan speed;
   a low fan speed adapts region extending between the predetermined low fan speed and the medium 1 fan speed;
   a high fan speed adapts region between the medium 2 fan speed and the predetermined high fan speed;
   a medium 1 fan speed adapts region extending from the medium 1 fan speed to the midpoint between the medium 1 and medium 2 fan speeds; and
   a medium 2 fan speed adapts region extending from the midpoint between the medium 1 and medium 2 fan speeds to the medium 2 fan speed.

11. The system of claim 7, wherein the look-up tables each include:
   three gain points for proportional gain P(1), P(2), P(3);
   three gain points for integral gain I(1), I(2), I(3); and
   three gain points for derivative gain D(1), D(2), D(3); and
   wherein the algorithms determine which gain point or gain points to increase or decrease based on real time performance of the cooling component and a comparison of a connecting line slope with the limited slope calculation, wherein the connecting line slope defines projected performance of the cooling component based on real time data.

12. A method for controlling a computer room air conditioner (CRAC) unit in a manner such that operation of a cooling component of the CRAC unit is modified to assist in controlling a supply air temperature of air being discharged by the CRAC unit, the method including:
   using a PID controller of the CRAC unit to control a proportional gain (P), an integral gain (I) and a derivative gain (D), wherein the proportion gain, the integral gain and the derivative gain are used to modify operation of the CRAC unit;
   using a memory to communicate with the PID controller;
   storing a plurality of look-up tables in the memory;
   using the look-up tables to hold different proportional, integral and derivative gains based on an operating variable associated with operation of the cooling component; and
   causing the PID controller to access the look-up tables and a limited slope calculation to determine projected operating data for the cooling component, wherein the cooling component includes at least one of a motor driven unit fan and an electrically adjustable chilled water (CW) supply valve, and to adjust at least one of the P, I and D gains for the cooling component in real time in response to evaluations of at least the projected operating data, to control the CRAC unit.

13. The method of claim 12, wherein causing the PID controller to determine projected operating data for the cooling component comprises causing the PID controller to determine the projected operating data for control of a unit fan.

14. The method of claim 12, wherein causing the PID controller to determine projected operating data for the cooling component comprises causing the PID controller to determine projected operating data for a position of a chilled water valve, where the chilled water valve controls a flow of water to the CRAC unit.

15. The method of claim 12, wherein the look-up tables each include:
   three gain points for proportional gain P(1), P(2), P(3);
   three gain points for integral gain I(1), I(2), I(3); and
   three gain points for derivative gain D(1), D(2), D(3); and
   wherein the PID controller determines which gain point or gain points to increase or decrease based on real time performance of the cooling component and a comparison of a connecting line slope with the limited slope calculation, wherein the connecting line slope defines projected performance of the cooling component based on real time data.

* * * * *